United States Patent
Hideishi et al.

(10) Patent No.: US 9,461,953 B2
(45) Date of Patent: Oct. 4, 2016

(54) MESSAGE NOTIFICATION DEVICE, CONTROL METHOD, AND RECORDING MEDIUM STORING CONTROL PROGRAM

(71) Applicant: SHARP KABUSHIKI KAISHA, Osaka-shi, Osaka (JP)

(72) Inventors: Chie Hideishi, Osaka (JP); Takayuki Nagamatsu, Osaka (JP); Masaki Hashiura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 186 days.

(21) Appl. No.: 14/185,293

(22) Filed: Feb. 20, 2014

(65) Prior Publication Data

US 2014/0244767 A1 Aug. 28, 2014

(30) Foreign Application Priority Data

Feb. 25, 2013 (JP) ................................ 2013-034997

(51) Int. Cl.
*H04L 12/58* (2006.01)
*H04L 12/28* (2006.01)

(52) U.S. Cl.
CPC ........... *H04L 51/24* (2013.01); *H04L 12/2825* (2013.01); *H04L 51/04* (2013.01); *H04L 51/26* (2013.01); *H04L 12/2803* (2013.01); *H04L 12/2818* (2013.01); *H04L 51/046* (2013.01)

(58) Field of Classification Search
CPC ........... H04L 12/2803; H04L 12/2818; H04L 12/2825; H04L 12/581; H04L 51/04
See application file for complete search history.

(56) References Cited

U.S. PATENT DOCUMENTS

| | | | |
|---|---|---|---|
| 6,735,615 B1 * | 5/2004 | Iwayama | H04L 12/2602 709/204 |
| 8,363,644 B2 * | 1/2013 | Kreitzberg | H04L 67/24 370/352 |
| 2004/0161080 A1 * | 8/2004 | Digate | H04L 12/581 379/88.17 |
| 2004/0161090 A1 * | 8/2004 | Digate | H04L 12/581 379/202.01 |
| 2008/0088425 A1 * | 4/2008 | Hara | B60K 35/00 340/438 |
| 2008/0183307 A1 * | 7/2008 | Clayton | G05B 19/042 700/8 |
| 2012/0078959 A1 * | 3/2012 | Cho | G05B 15/02 707/770 |
| 2012/0278414 A1 * | 11/2012 | Walsh | H04L 12/5855 709/206 |
| 2013/0218553 A1 * | 8/2013 | Fujii | G10L 15/26 704/9 |
| 2013/0325958 A1 * | 12/2013 | Mizuki | H04L 51/32 709/204 |

FOREIGN PATENT DOCUMENTS

JP 2005-173885 A 6/2005

* cited by examiner

*Primary Examiner* — Jeong S Park
(74) *Attorney, Agent, or Firm* — Birch, Stewart, Kolasch & Birch, LLP

(57) ABSTRACT

An agent server determines a posting timing of a message on a family message board on the basis of urgency associated with situation information based on which a message is generated and a posting state, which is obtained by the posting state obtaining section, on the family message board.

12 Claims, 18 Drawing Sheets

FIG. 6

| SITUATION INFORMATION | URGENCY |
|---|---|
| ROOM TEMPERATURE:35° C OR MORE | HIGH |
| DUST SUCTION AMOUNT:70% OR MORE | LOW |
| TRAVEL DISTANCE:600m OR MORE | LOW |
| ERROR 1 (RUN-DOWN BATTERY) | HIGH |
| ERROR 2 (CLEANING ROBOT 5 RUNS ON TO A STEP AND CANNOT MOVE) | HIGH |
| CLEANING NOW | LOW |

FIG. 7

| MESSAGE | SITUATION INFORMATION | URGENCY OF MESSAGE |
|---|---|---|
| ERROR OCCURS.<br><br>《〈INTERIM REPORT〉》<br>・TRAVEL DISTANCE SO FAR:300m<br>・DUST SUCTION AMOUNT SO FAR(*1):10/100<br>・ERROR STATE:E999 → WHEELS RUN ON TO A STEP AND CANNOT MOVE | ERROR 2 (CLEANING ROBOT 5 RUNS ON TO A STEP AND CANNOT MOVE)<br><br>(ADDITIONAL INFORMATION)<br>・TRAVEL DISTANCE:300m<br>・DUST SUCTION AMOUNT:10/100 | HIGH |

FIG. 8

| POSTING STATE | URGENCY OF MESSAGE | POSTING/NOT POSTING MESSAGE | EMPLOYMENT FLAG |
|---|---|---|---|
| EXISTENCE OF MESSAGE | LOW | POSTING | ○ |
| | | NOT POSTING | ● |
| | HIGH | POSTING | ● |
| | | NOT POSTING | ○ |
| NO MESSAGE | LOW | POSTING | ● |
| | | NOT POSTING | ○ |
| | HIGH | POSTING | ○ |
| | | NOT POSTING | ● |

FIG. 15

| MESSAGE LOG STATE | POSTING STATE (POSTING FREQUENCY) |
|---|---|
| MEMBERS MADE STATEMENTS FOUR OR MORE TIMES WITHIN THE MOST RECENT 30 MINUTES. | 4 |
| MEMBERS MADE STATEMENTS THREE TIMES WITHIN THE MOST RECENT 30 MINUTES. | 3 |
| MEMBERS MADE STATEMENTS TWICE WITHIN THE MOST RECENT 30 MINUTES. | 2 |
| MEMBERS MADE A STATEMENT ONCE WITHIN THE MOST RECENT 30 MINUTES. | 1 |
| MEMBERS DID NOT MAKE ANY STATEMENT WITHIN THE MOST RECENT 30 MINUTES. | 0 |

FIG. 16

| SITUATION INFORMATION CONTENTS | URGENCY |
|---|---|
| ERROR 2 (CLEANING ROBOT 5 RUNS ON TO A STEP AND CANNOT MOVE) | 4 |
| ERROR 1 (RUN-DOWN BATTERY) | 3 |
| ROOM TEMPERATURE:35° C OR MORE | 2 |
| DUST SUCTION AMOUNT:70% OR MORE | 1 |
| TRAVEL DISTANCE:600m OR MORE | 0 |
| CLEANING NOW | 0 |

FIG. 17

| Min URGENCY | Max URGENCY | Min FREQUENCY | Max FREQUENCY |
|---|---|---|---|
| 3 | 4 | 2 | 4 |
| 0 | 2 | 0 | 1 |

FIG. 18

| Min URGENCY | Max URGENCY | Min FREQUENCY | Max FREQUENCY |
|---|---|---|---|
| 1 | 1 | 1 | 1 |
| 0 | 0 | 0 | 0 |

MESSAGE NOTIFICATION DEVICE, CONTROL METHOD, AND RECORDING MEDIUM STORING CONTROL PROGRAM

This Nonprovisional application claims priority under 35 U.S.C. §119 on Patent Application No. 2013-034997 filed in Japan on Feb. 25, 2013, the entire contents of which are hereby incorporated by reference.

TECHNICAL FIELD

The present invention relates to a message notification device etc. for notifying a user of a message.

BACKGROUND ART

There have been conventionally known a technique of remotely controlling, with use of a mobile terminal, network home devices (such as vacuum cleaners, air conditioning devices, and audiovisual equipment which are connectable to networks) by connecting the network home devices to the Internet and a technique of notifying a mobile terminal of a message indicating a state etc. of such a network home device.

For example, Patent Literature 1 below discloses a technique of reducing alarm information generated by network home devices in conformity with reduction rule data, thereby notifying a mobile terminal of important alarm information such as malfunctions in real time in an arranged manner.

CITATION LIST

Patent Literature

Patent Literature 1
Japanese Patent Application Publication, Tokukai, No. 2005-173885 A (Publication date: Jun. 30, 2005)

SUMMARY OF INVENTION

Technical Problem

However, conventional arts as described above have a problem that a message indicating a state etc. of a network home device is notified to a user without regard for a state of the user.

Since the message is notified without regard for the state of the user, the following cannot be performed obviously: non-urgent messages are sent collectively when the user has time to read. In a case where the user is busy in particular, it is highly possible that the user is bothered by messages which are sent in spite of no urgency and the user overlooks an urgent message hidden among non-urgent messages.

The present invention has been made in view of the above problem, and an object of the present invention is to provide a message notification device, a control method, and a control program which can notify a user of a message at an effective timing in consideration of (i) urgency of a message indicating a state etc. of an external device and (ii) a situation of a user.

Solution to Problem

In order to achieve the above object, a message notification device according to one embodiment of the present invention includes: posting state obtaining means for obtaining a posting state in a communication service for chronologically displaying messages that a member(s) has/have posted; situation information obtaining means for obtaining situation information obtained in an external device; message generation means for generating a message of the situation information obtained by the situation information obtaining means; posting timing determination means for determining a notification timing of the message generated by the message generation means to a posting timing of the message, the posting timing of the message having been associated in advance with a combination of a posting state and urgency associated with the situation information based on which the message is generated, the posting state being obtained by the posting state obtaining means; and message display means for displaying the message generated by the message generation means on the communication service by outputting, at the posting timing determined by the posting timing determination means, the message to a server which provides the communication service.

Advantageous Effects of Invention

According to one embodiment of the present invention, it is possible to notify a user of a message at an effective timing in consideration of urgency of the message and a state of the user.

BRIEF DESCRIPTION OF DRAWINGS

FIG. 6 is a view showing a data structure and a specific example of a message urgency definition table which defines a correlation between situation information and urgency of a message about the situation information.

FIG. 7 is a view showing a specific example where urgency of a message about situation information is set in accordance with the situation information.

FIG. 8 is a view showing a data structure and a specific example of a posting timing condition table in which posting timings of messages are associated with combinations of urgency of the messages and a posting state.

FIG. 15 is a view showing a data structure and a specific example of a message urgency definition table which defines a correlation between (i) a posting state of messages by family members on a family message board within a predetermined time period and (ii) a posting state obtained by a posting state obtaining section.

FIG. 16 is a data structure and a specific example of a message urgency definition table which is different from that of FIG. 6.

FIG. 17 is a data structure and a specific example of a message urgency definition table which is different from that of FIG. 8.

FIG. 18 is a data structure and a specific example of a message urgency definition table which is different from those of FIG. 8 and FIG. 17.

DESCRIPTION OF EMBODIMENTS

The following description will discuss embodiments of the present invention with reference to FIG. 1 to FIG. 18 in detail.

Note that the following embodiments will discuss, as merely examples, examples where a message notification device of the present invention is applied to a family message-board system. The family message-board system is a communication system in which one family forms one community with use of a family message board provided by a family message-board server and members (e.g., father, mother, and children) of the one family have conversation (posting and browsing messages) by using their own mobile terminals. The members can have conversation by using not only their own mobile terminals but also shared terminals in a house such as a network-compatible television and a tablet. The message notification device according to one embodiment of the present invention serves as an agent server in the family message-board system. As will be described in detail below, the agent server is a device which has authority to give a pseudo-personality as a member of a family to a home device which operates in a house of the family and to post a message (make a statement) on the family message board of the family in place of the home device thus personified (hereinafter, referred to as "personified device").

In order to easily understand the message notification device according to one embodiment of the present invention, first, the family message-board system will be schematically summarized below.

[Outline of Family Message-Board System]

Figure 2:
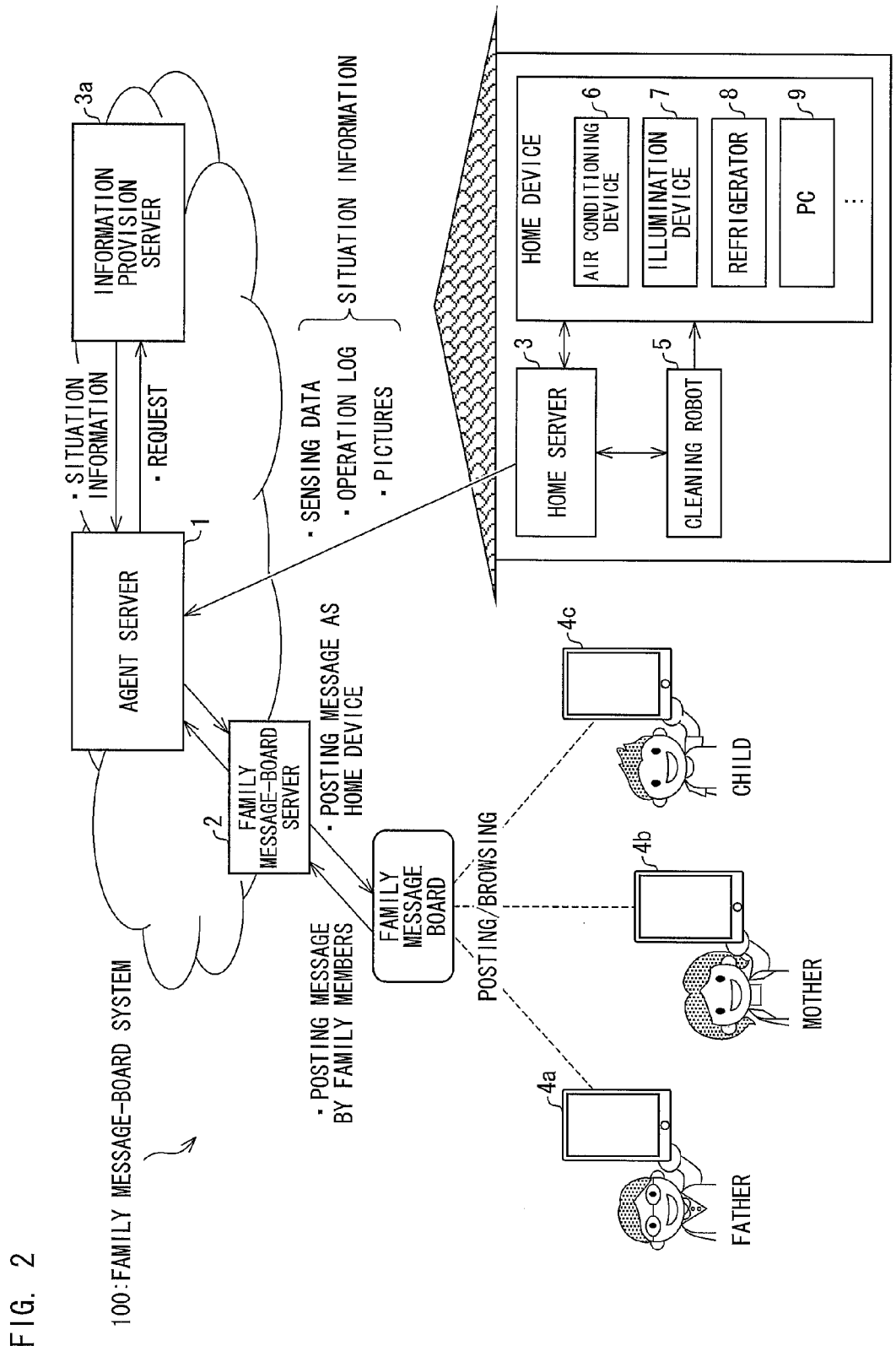
FIG. 2 is a schematic view illustrating a family message-board system including the agent server of FIG. 1.

The following description will discuss the outline of the family message-board system according to one embodiment of the present invention with reference to FIG. 2.

FIG. 2 is a schematic view illustrating a family message-board system 100.

The family message-board system 100 is a system which provides an electronic bulletin board (communication service) for communication between/among members of a registered community. As will be described in detail below, the family message-board system 100 is configured such that the personified device posts, on the family message board, situation information such as a state of a device (hereinafter, referred to as "home device") placed in a house (space shared by the members of the community).

As shown in FIG. 2, the family message-board system 100 includes an agent server 1, a family message-board server 2, and a home server 3. Further, mobile terminals 4a, 4b, and 4c possessed by family members (father, mother, and a child in FIG. 2) access the family message board, and the members can post and browse a message on the family message board by using their mobile terminals. The home server 3 is connected to a cleaning robot 5 via a wireless communication network, and to other home devices via a wireless or wired communication network. Note that FIG. 2 illustrates an example where the cleaning robot 5 serves as a personified device and other home devices are an air conditioning device 6, an illumination device 7, a refrigerator 8, and a PC (personal computer) 9, however, kinds and the number of home devices are not particularly limited. In addition, audiovisual equipment such as televisions, recording devices, and speakers may be also encompassed in the home devices.

The situation information indicates whole information that the agent server 1 obtains from external devices. In the family message-board system 100 of FIG. 2, the external devices mean the family message-board server 2, the home server 3, and an information provision server 3a described below. Further, the situation information includes not only information that the agent server 1 directly obtains from those external devices but also information that the agent server 1 obtains via the external devices.

The agent server 1 posts a message about situation information, such as a state of a home device and information obtained by the home device, on the family message board in accordance with a posting state of messages on the family message board by the members. More specifically, the agent server 1 posts a message as a character which is personification of the cleaning robot 5. Note that a configuration of the agent server 1 will be described in detail below.

The family message-board server 2 performs a whole process regarding the family message board such as displaying of a display screen of the family message board on the mobile terminals 4a, 4b, and 4c and management of posting of messages.

The home server 3 collectively control transmission and reception of information between the cleaning robot 5 or a home device and the agent server 1. Specifically, the home server 3 transmits information obtained from the cleaning robot 5 and information obtained from the home device to the agent server 1.

Note that, in the example shown in FIG. 2, sensing data obtained by a sensor mounted on the cleaning robot 5 or a sensor mounted on the home device, an operation log of the home device, and a picture took by the home device are transmitted, however, information to be transmitted is not limited thereto. The information collected in the home in this way is provided as situation information to the agent server 1 from the home server 3. By using the situation information, the agent server 1 can grasp a situation in a community (here, home and family in FIG. 2).

For example, in a case where there is no need to collectively control the home devices, e.g., in a case where no home device regarding the family message board exists, the cleaning robot 5 may transmit/receive information to/from the agent server 1 without the home server 3.

The mobile terminals 4a, 4b, and 4c are devices used for browsing the family message board and posting a message. FIG. 2 shows an example where the mobile terminals 4a, 4b, and 4c are smartphones, however, the mobile terminals are not limited thereto provided that the mobile terminals can be used to browse the family message board and post a message. Hereinafter, in a case where there is no need to distinguish the mobile terminals 4a, 4b, and 4c particularly, those terminals are collectively called "mobile terminal 4". Further, hereinafter, father, mother, a child, and the cleaning robot 5 in FIG. 2 are expressed as "Dad", "Mom", "Taro", and "Robo", respectively, as information indicating speakers of the family message board displayed on a screen of the mobile terminal 4.

The cleaning robot 5 is a self-propelled vacuum cleaner which automatically cleans floors. The cleaning robot 5 has not only a function for cleaning but also a memorizing function of operation logs, a detecting and outputting function of remaining battery charge, an image photographing function, a voice recognizing function, a voice outputting function, and the like. The cleaning robot 5 further has a function of transmitting a control signal to a home device other than the cleaning robot 5 and operating the home device.

The air conditioning device 6 is a device for performing air-conditioning such as heating and cooling, i.e., so-called air conditioner. The air conditioning device 6 includes a temperature sensor, and transmits a room temperature sensed by the temperature sensor to the home server 3.

The illumination device 7 is an illumination device including a light source such as LED, and can be turned on and off by control of the home server 3.

The refrigerator 8 is a storage which stores food etc. at an optimum temperature. The refrigerator 8 includes sensing devices such as a camera, a weight sensor, and an IC tag reader, and has a function of obtaining situation information on stocks in the refrigerator 8 and a communicating function of uploading the situation information to the home server 3.

The PC 9 is so-called personal computer. A single PC 9 may be provided to be shared by the family members, or a plurality of PCs 9 may be possessed by respective members. The PC 9 is achieved by a desktop computer, a notebook computer, a tablet PC, or the like.

Further, the agent server 1 has an information search function of collecting necessary information via the Internet. As illustrated in FIG. 2, the agent server 1 can access various information provision servers 3a (although not shown, existence of multiple information provision servers (3b, 3c, . . . ) is estimated) which connect to the Internet. In this embodiment, the agent server 1 obtains situation information from the information provision server 3a and therefore grasps a situation of an external environment (event which occurs in the external environment and could influences the family) surrounding the community shown in FIG. 2. The contents of the situation information obtained from the information provision server 3a are not limited to situations of the above external environment, and is supposed to be, for example, information on retail stores and facilities that are neighbor to this family's house and information on weather forecast for an area in which the family is interested.

Thus, in the family message-board system 100, the agent server 1 obtains the situation information and posts a message of the situation information on the family message board in place of the personified device (cleaning robot 5).

The agent server 1 controls a timing of posting a message in consideration of a posting state of messages by the family members on the family message board and urgency of the message to be posted. Therefore, the agent server 1 can notify the family members of the message of the situation information at an effective timing. This can reduce a possibility that the members are bothered by non-urgent messages which are sent in spite of no urgency when the members are busy and overlook an urgent message hidden among non-urgent messages.

Hereinafter, the following description will discuss in detail the configuration of the agent server 1 for notifying the family members of the message of the situation information at an effective timing.

Configuration Common to Embodiments

In the following Embodiments described below, a message notification device of the present invention is achieved by, as an example, an agent server of the family message-board system 100. Here, a configuration common to Embodiments will be described prior to detailed description of Embodiments.

The agent server 1 and an agent server 101 (message notification device) according to one embodiment of the present invention includes: a posting state obtaining section 24 (posting state obtaining means) for obtaining a posting state in a family message board (a communication service for chronologically displaying messages that a member(s) has/have posted); a situation information obtaining section (situation information obtaining means) for obtaining situation information obtained in an external device; a message generation section 21 (message generation means) for generating a message of the situation information obtained by the situation information obtaining section 20; a posting timing determination section 25 (posting timing determination means) for determining a notification timing of the message generated by the message generation means to a posting timing of the message, the posting timing of the message having been associated in advance with a combination of a posting state and urgency associated with the situation information based on which the message is generated, the posting state being obtained by the posting state obtaining section 24; and a message display section 26 (message display means) for displaying the message generated by the message generation section 21 on the family message board by outputting, at the posting timing determined by the posting timing determination section 25, the message to the family message-board server 2.

Therefore, the agent servers 1 and 101 control a timing of posting a message in consideration of a posting state of messages by the family members on the family message board and urgency of the message to be posted. This makes it possible to notify the family members of the message of the situation information at an effective timing.

Note that, in the drawings used to describe the following embodiments, identical members or members having the like functions are denoted by the like symbols and the description thereof will not be discussed repeatedly. Further, for the sake of clarification and simplification of the drawings, dimensions such as a length, a size, a width, etc. and shapes in the drawings are changed as appropriate, so that those dimensions and shapes are not actual ones.

Embodiment 1

Figure 1:
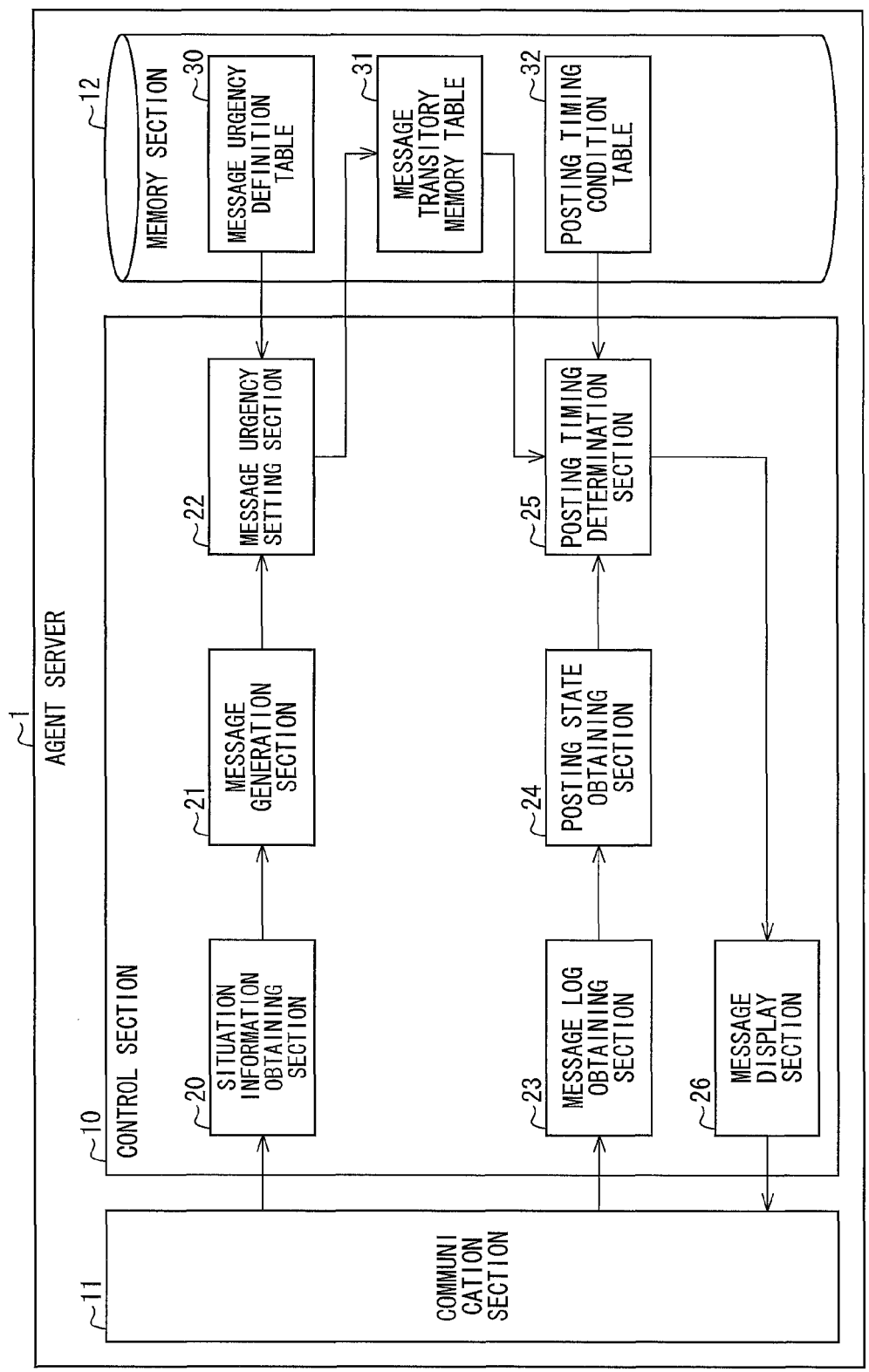
FIG. 1 is a block diagram illustrating an example main configuration of an agent server according to one embodiment of the present invention.

FIG. 1 is a block diagram illustrating an example main configuration of the agent server 1.

Figure 3:
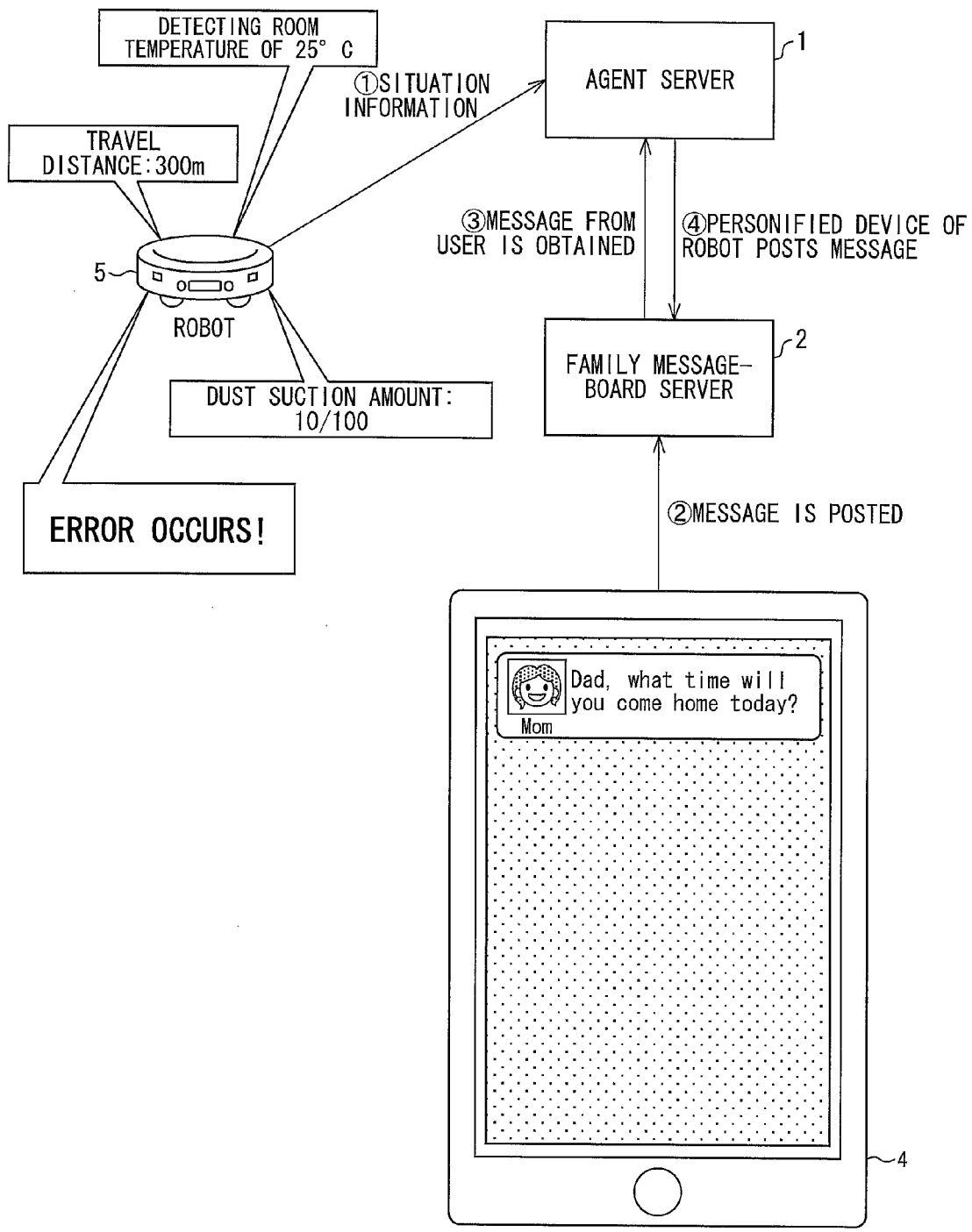
FIG. 3 is a view illustrating a situation where, after a predetermined circumstance occurred, a member has posted a message on a family message board in the family message-board system of FIG. 2.

FIG. 3 is a view illustrating a situation where, after a circumstance in which "An error occurs in the cleaning robot 5" occurred, a member has posted a message on the family message board in the family message-board system of FIG. 2.

Figure 4:
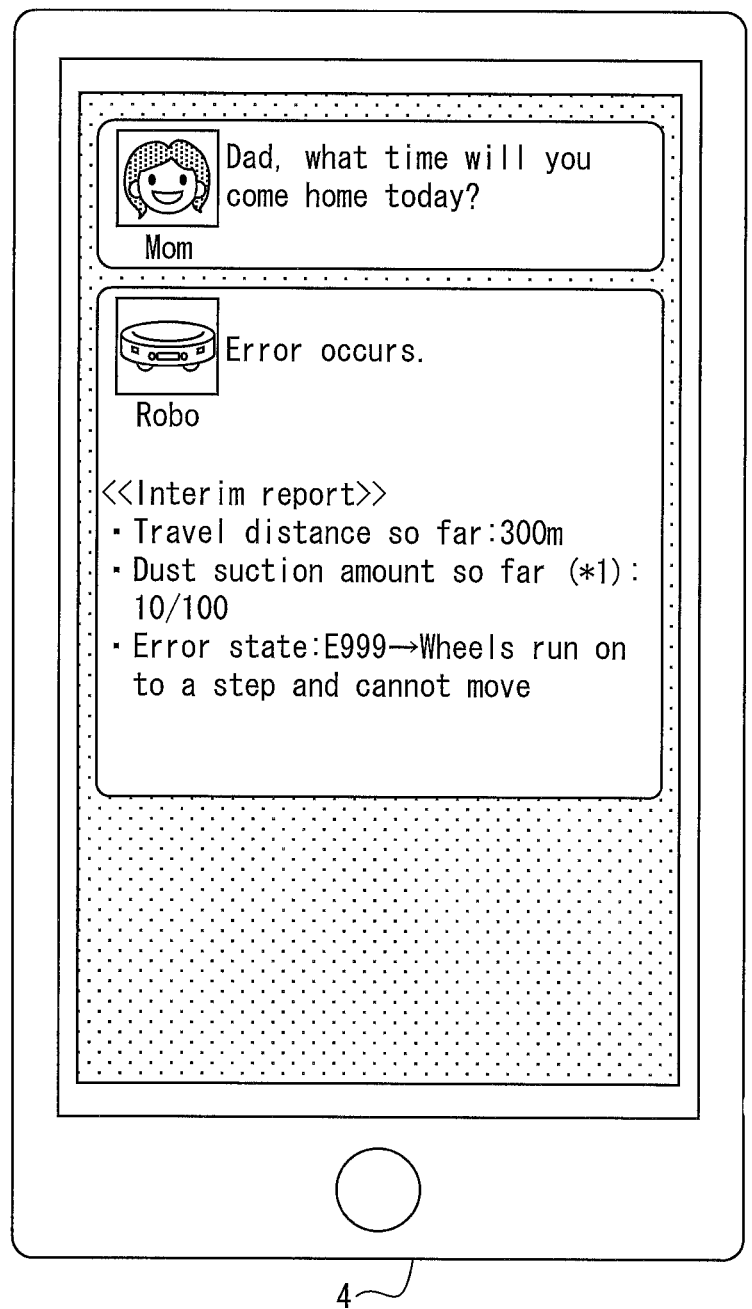
FIG. 4 is an example screen of the family message board displayed on a mobile terminal of each member after the situation of FIG. 3.

FIG. 4 is an example screen of the family message board displayed on a mobile terminal of each member after the situation of FIG. 3.

As illustrated in FIG. 1, the agent server 1 of this embodiment includes a control section 10, a communication section 11, and a memory section 12.

More specifically, the agent server 1 includes: a posting state obtaining section 24 (posting state obtaining means) for obtaining a posting state in a family message board (a communication service for chronologically displaying messages that a member(s) has/have posted); a situation information obtaining section 20 (situation information obtaining means) for obtaining situation information obtained in an external device; a message generation section 21 (message generation means) for generating a message of the situation information obtained by the situation information obtaining section 20; a posting timing determination section 25 (posting timing determination means) for determining a notification timing of the message generated by the message generation means to a posting timing of the message, the posting timing of the message having been associated in advance with a combination of a posting state and urgency associated with the situation information based on which the message is generated, the posting state being obtained by the posting state obtaining section 24; a message display section 26 (message display means) for displaying the message generated by the message generation section 21 on the family message board by outputting, at the posting timing determined by the posting timing determination section 25, the message to the family message-board server 2; and a storage section 12 which stores (i) a message urgency definition table 30 for defining a correlation between the situation information and the urgency of the message of the situation information and (ii) a posting timing condition table 32 in which the message posting timing is associated with the combination of the urgency of the message and the posting state, wherein the posting timing determination section 25 determines, on the basis of the posting timing condition table 32, the posting timing of the message generated by the message generation section 21 to the message posting timing which is associated with the combination of the posting state obtained by the posting state obtaining section 24 and the urgency associated in the message urgency definition table 30 with the situation information based on which the message is generated.

Therefore, the posting timing determination section 25 can control a posting timing of a message to be posted on the family message board on the basis of (i) urgency which is associated in the message urgency definition table 30 with situation information based on which the message is generated and (ii) a posting state of messages on the family message board by the members.

Therefore, the members can change the urgency of the message of the situation information by appropriately changing the correlation between the situation information and the urgency in the message urgency definition table 30.

Further, it is possible to appropriately change the posting timing of the message associated with the combination of the urgency of the message and the posting state in the posting timing condition table 32. Therefore, the members can select a timing at which the message is posted on the family message board in accordance with the urgency of the message.

In other words, the agent server 1 can post a message on the family message board in accordance with the urgency of the message at a timing selected by a member(s). This can improve usability.

Note that, in order to easily understand the message notification device according to one embodiment of the present invention, the agent server 1 further includes a message urgency setting section 22 and a message log obtaining section 23, and the memory section 12 includes a message transitory memory table 31. Note, however, that, as will be described in detail below, the message urgency setting section 22, the message log obtaining section 23, and the message transitory memory table 31 are not essential for the agent server 1.

Each function section and each table stored in the memory section 12 will be described in detail.

The communication section 11 allows the agent server 1 to communicate with an external device. Specifically, the agent server 1 communicates with the family message-board server 2, the home server 3, and the various information provision servers 3a, 3b, 3c, . . . via the communication section 11.

The memory section 12 is a memory device for storing various kinds of data used by the agent server 1.

The memory section 12 non-transitorily stores (1) a control program that the agent server 1 executes, (2) an OS program, (3) application programs that the control section 10 uses to execute various functions of the agent server 1, and (4) various kinds of data read out when the application programs are executed.

The data (1) to (4) are stored in, for example, a nonvolatile memory device such as ROM (read only memory), flash memory, EPROM (Erasable Programmable ROM), EEPROM (registered trademark) (Electrically EPROM), or HDD (Hard Disc Drive).

The agent server 1 may include a transitory memory section (not shown). The transitory memory section is a so-called working memory which transitorily stores data for use in calculation, calculation results, etc. in processes of various steps executed by the agent server 1, and is constituted by a volatile memory device such as RAM (Random Access Memory).

Which data is stored in which memory device is appropriately determined on the basis of purposes of use, convenience, costs, physical limitations, etc. of the agent server 1.

The memory section 12 stores: the message urgency definition table 30 which defines a correlation between situation information and urgency of a message of the situation information; and the posting timing condition table 32 in which a posting timing of the message is associated with a combination of the urgency of the message and a posting state. The memory section 12 further stores the message transitory memory table 31. However, as will be described in detail below, in the agent server 1, it is not essential for the memory section 12 to store the message transitory memory table 31.

The control section 10 collectively controls the functions of the agent server 1. The control section 10 shown in FIG. 1 includes, as function blocks, the situation information obtaining section 20, the message generation section 21, the message urgency setting section 22, the message log obtaining section 23, the posting state obtaining section 24, the posting timing determination section 25, and the message display section 26. Note, however, that, as will be described in detail below, it is not essential for the agent server 1 to include the message urgency setting section 22 and the message log obtaining section 23.

The function blocks of the control section 10 described above can be achieved by reading out, for example, a program stored in the memory device (memory section 12) achieved by a ROM (Read Only Memory), an NVRAM (Non-Volatile Random Access Memory), or the like with use of a CPU (Central Processing Unit) or the like to a RAM (Random Access Memory) (not shown) or the like and executing the program.

The situation information obtaining section 20 collects situation information from an external device.

Specifically, the situation information is information indicating events in a community which is collected from each home device provided in a house of a family (community). The situation information is kept by the home server 3. The situation information obtaining section 20 obtains the situation information from the home server 3. To be more specific, the situation information obtained by the situation information obtaining section 20 from the home server 3 encompass information of stocks in refrigerator, calendar information, etc., however, the situation information is not limited thereto.

Alternatively, the situation information is information regarding an external environment surrounding the house (community). The situation information is kept by the information provision server 3a. The situation information obtaining section 20 obtains the situation information from the information provision server 3a. To be more specific, the situation information obtained from the information provision server 3a encompass information on regional retail stores, information on weather forecast, information on swimming pool facilities, etc., however, the situation information is not limited thereto.

In an example shown in FIG. 3, the situation information obtaining section 20 obtains the following situation information from the cleaning robot 5 (actually, the home server 3). Specifically, the situation information obtaining section 20 obtains, from the home server 3, situation information indicating "error 2 (the cleaning robot 5 runs on to a step and cannot move", i.e., indicating that "There is an error state in which the cleaning robot 5 runs on to a step and cannot move".

In addition to the situation information (additional information), the situation information obtaining section 20 further obtains information indicating "Travel distance: 300 m, Dust suction amount: 10/100", i.e., indicating that "A travel distance of the cleaning robot 5 from the start of cleaning is 300 m and a dust suction amount is 10% of a dust cup".

Note that, as will be described in detail below, situation information and information other than the situation information are different from each other in the following point. That is, for the agent server 1, the situation information is information whose urgency has been determined in advance, i.e., the agent server 1 can at least determine or obtain the urgency of the situation information. On the contrary, for the agent server 1, urgency of the information other than the situation information is not determined in advance. Therefore, an external device for transmitting the situation information to the agent server 1 may or may not distinguish the situation information from the information other than the situation information.

The message generation section 21 generates a message of situation information obtained by the situation information obtaining section 20. For example, on the basis of situation information of "error 2 (the cleaning robot 5 runs on to a step and cannot move)" and information "Travel distance: 300 m, Dust suction amount: 10/100", the message generation section 21 generates a message as a message from the Robo as shown in FIG. 4. FIG. 4 illustrates, as the message from the Robo, a message indicating that "An error occurs. Travel distance so far: 300 m, Dust suction amount so far: 10/100, Error state: E999 Wheels run on to a step and cannot move".

As to the message generated by the message generation section 21, the message urgency setting section 22 sets, on the basis of the message urgency definition table 30, urgency of the message to be associated with the situation information based on which the message is generated. For example, in a case where the message urgency definition table 30 defines a correlation between situation information and urgency of a message of the situation information, as shown in FIG. 6, the message urgency setting section 22 performs the following processes. That is, because the urgency of the situation information of "error 2 (Robo runs on to a step and cannot move)" is set to "high", the message urgency setting section 22 sets the urgency of the message of the "error 2" to "high".

The message urgency setting section 22 sets the urgency of the message, and then causes the urgency to be stored in the message transitory memory table 31 as shown in FIG. 7. Note, however, that, as will be described in detail below, it is not essential for the agent server 1 to include the message transitory memory table 31, and the message urgency setting section 22 may transmit, to the posting timing determination section 25, the message whose urgency has been determined. The correlation between situation information and urgency of a message of the situation information, which is defined by the message urgency definition table 30, will be described in detail below.

Note that the message urgency setting section 22 is not essential in a case where urgency associated in the message urgency definition table 30 with situation information based on which a message is generated is used as urgency of the message as it is. This is because, in this case, the posting timing determination section 25 (described later) directly refers to the message urgency definition table 30 and obtains the urgency of the message generated by the message generation section 21.

In other words, in a case where the urgency of the message can be determined only on the basis of the message urgency definition table 30 with use of the situation information based on which the message is generated, the posting timing determination section 25 can obtain the urgency of the message in the following manner. The posting timing determination section 25 can obtain the urgency of the message generated by the message generation section 21 on the basis of the message urgency definition table 30 with use of the situation information based on which the message is generated. To put it another way, the posting timing determination section 25 can read out, from the message urgency definition table 30 of FIG. 6, urgency information indicating urgency associated with situation information corresponding to the situation information obtained by the situation information obtaining section 20.

The agent server 1 needs to be configured such that the posting timing determination section 25 obtains the urgency of the message generated by the message generation section 21. In a case where the urgency of the message can be determined only on the basis of the situation information based on which the message is generated, the message urgency setting section 22 is not essential.

The message log obtaining section 23 obtains, from the family message-board server 2, a message log which is a history of messages posted on the family message board by the family members. For example, in the situation in FIG. 3, Mother (Mom) posts, on the family message board, a message indicating that "Dad, what time will you come home today?" with use of the mobile terminal 4. The message log obtaining section 23 has already obtained, from the family message-board server 2, the message log which is the history of messages posted on the family message board, and therefore obtains a new message log including the message from Mother.

The posting state obtaining section 24 obtains, from the message log obtained by the message log obtaining section 23, a posting state of messages on the family message board by the family members.

In this embodiment, the posting state means frequency of posting messages within a predetermined time period. The frequency of posting messages can be easily obtained from the family message-board server 2. Note that, in this embodiment in particular, the posting state obtaining section 24 obtains information on whether or not the family members have posted any message on the family message board, i.e., information on existence or nonexistence of messages. The information on existence or nonexistence of messages can be obtained from the family message-board server 2 extremely easily, and it is extremely easy to determine whether or not any message has been posted.

In a case of the example of FIG. 3, the message log obtaining section 23 obtains, from the family message-board server 2, the message log including the message that Mother has posted, and then the posting state obtaining section 24 obtains, from the message log, a posting state indicating that a message "has been posted".

Note that, in a case where the family message-board server 2 can obtain a posting state of messages on the family message board by the members and notify the posting state obtaining section 24 of the posting state, the posting state obtaining section 24 may directly obtain the posting state from the family message-board server 2. That is, it is not essential for the agent server 1 to include the message log obtaining section 23, and the posting state obtaining section 24 only needs to obtain the posting state of messages on the family message board by the members.

The posting timing determination section 25 determines a posting timing of a message on the basis of the posting timing condition table 32 with use of the urgency of the message and the posting state. In this embodiment, the posting timing determination section 25 determines the posting timing of the message on the basis of the posting timing condition table 32 with use of the urgency of the message stored in the message transitory memory table 31 and the posting state obtained by the posting state obtaining section 24. Note that, in a case where, as described above, the urgency of the message can be determined only on the basis of the message urgency definition table 30 with use of the situation information based on which the message is generated, the message urgency setting section 22 is not essential. Further, it is also not essential for the posting timing determination section 25 to obtain the message and the urgency of the message from the message transitory memory table 31. The posting timing determination section 25 may directly refers to the message urgency definition table 30 and obtains the urgency of the message generated by the message generation section 21.

Here, for example, in a case where the posting timing condition table 32 associates a posting timing of a message with a combination of urgency of the message and a posting state as shown in FIG. 8, the posting timing determination section 25 performs the following processes.

That is, in rows in which "Employment Flags" are checked off in the posting timing condition table 32 of FIG. 8, a message whose urgency is "low" is not posted in the posting state of "existence of message(s), whereas a message whose urgency is "high" is posted. Meanwhile, in the posting state of "no message", a message whose urgency is "low" is posted and a message whose urgency is "high" is not posted. In other words, the posting timing condition table 32 of FIG. 8 defines that a message whose urgency is "high" is not posted in the posting state of "no message", whereas the message is posted at a timing of "existence of message(s)".

Therefore, in a case where the urgency of the message indicating the situation information of the "error 2 (the cleaning robot 5 runs on to a step and cannot move)" is set to "high", the posting timing determination section 25 determines a timing of "existence of message(s)" to a posting timing of the message. In other words, the posting timing determination section 25 determines the posting timing of the message of the error 2 so that the message of the error 2 is posted at a timing at which the posting timing determination section 25 obtains a posting state of "existence of message(s)" from the posting state obtaining section 24.

Note that, in the above description, the posting timing determination section 25 determines the posting timing of the message stored in the message transitory memory table 31 on the basis of the urgency of the message and the posting state. However, the posting timing determination section 25 may determine the posting timing of the message by directly obtaining the message and the urgency of the message associated with the message from the message urgency setting section 22 and combining the urgency of the message thus obtained with the posting state obtained by the posting state obtaining section 24. That is, the posting timing determination section 25 may determine the posting timing of the message on the basis of the posting timing condition table 32 with use of the urgency of a message set by the message urgency setting section 22 and the posting state obtained by the posting state obtaining section 24.

The message display section 26 outputs the message generated by the message generation section 21 to the family message-board server 2 at the posting timing determined by the posting timing determination section 25 and displays the message on the family message board.

The message outputted by the message display section 26 is posted on the family message board (FIG. 2) as a statement by the cleaning robot 5, and is presented to the mobile terminal 4 of each member.

[Contents of Tables]

FIG. 6 is a view showing a data structure and a specific example of the message urgency definition table 30.

FIG. 7 is a view showing a specific example of the message transitory memory table 31 where urgency of a message about situation information is set according to situation information.

FIG. 8 shows a data structure and a specific example of the posting timing condition table 32.

The message urgency definition table 30 defines a correlation between situation information and urgency of a message of the situation information. In the message urgency definition table 30, for example, as shown in FIG. 6, situation information indicating "Travel distance: 600 m or more", i.e., indicating that "A travel distance of the cleaning robot 5 from the start of cleaning is 600 m or more", is associated with "low" urgency. Further, situation information indicating "error 2 (the cleaning robot 5 runs on to a step and cannot move)", i.e., indicating that "There is an error state in which the cleaning robot 5 runs on to a step and cannot move" is associated with "high" urgency.

Note that, for the agent server 1, the situation information is, for example, information whose urgency has been determined in advance by the message urgency definition table 30. For the agent server 1, information whose urgency cannot be decided or determined is information other than the situation information. Therefore, information whose urgency has been determined in advance and can be at least determined, decided, or obtained by the agent server 1 is the situation information for the agent server 1.

As shown in FIG. 7, the message transitory memory table 31 transitorily stores a combination of a message and urgency of the message set by the message urgency setting section 22. The posting timing determination section 25 obtains the urgency of the message which is stored in combination with the message in the message transitory memory table 31.

FIG. 7 shows that the message urgency setting section 22 has set the urgency of the message of the situation information on the "error 2 (the cleaning robot 5 runs on to a step and cannot move)" to "high" on the basis of the message urgency definition table 30 shown in FIG. 6.

Note that, as described above, the message transitory memory table 31 is not essential for the agent server 1. In a case where the agent server 1 does not include the message transitory memory table 31, the combination of the message and the urgency of the message set by the message urgency setting section 22 is directly transmitted/received between the message urgency setting section 22 and the posting timing determination section 25.

In a case where the urgency of the message can be determined only on the basis of the message urgency definition table 30 with use of the situation information based on which the message is generated, the message urgency setting section 22 is also unnecessary. In this case, the posting timing determination section 25 obtains the urgency of the message generated by the message generation section 21 by directly referring to the message urgency definition table 30.

The posting timing condition table 32 associates a posting timing of a message with a combination of urgency of the message and a posting state. In the posting timing condition table 32, for example, in a posting state of "existence of message(s)" as shown in FIG. 8, the following is associated: the message "will not be posted" in a case where urgency of the message is set to "low", whereas the message "will be posted" in a case where the urgency is set to "high". Meanwhile, in a posting state of "no message", the following is associated: the message "will posted" in a case where the urgency of the message is set to "low", whereas the message "will not be posted" when the urgency is set to "high".

In a case where a timing of posting a message is defined as shown in the posting timing condition table 32 of FIG. 8, the agent server 1 can control the timing of posting the message according to urgency (high or low) of the message as follows. That is, in a case of "existence of message(s)", i.e., in a case where it is highly possible that the family have conversation on the family message board, a message whose urgency is "low", which is considered to be less important, is not posted because posting the message might bother the conversation. Meanwhile, in a case of "existence of message(s)", a message whose urgency is "high", which is considered to be important, is posted because, although posting the message might bother the conversation, it is highly possible that the family reads the message.

On the contrary, in a case of "no message", i.e., the family is unlikely to have conversation on the family message board and posting a message does not bother the conversation, a message whose urgency is "low" is posted. Meanwhile, in a case of "no message", a message whose urgency is "high" is not posted because there is a possibility that no one of the family notices the message, and, when the possibility that any one of the family notices the message is increased, the message is posted.

In other words, the agent server 1 does not post a message on the family message board in a case where a posting state is "existence of message(s)" and urgency of the message is "low", and posts the message after the agent server 1 obtains a posting state of "no message". Meanwhile, the agent server 1 does not post a message on the family message board in a case where a posting state is "no message" and urgency of the message is "high", and posts the message after the agent server 1 obtains the posting state of "existence of message(s)".

In example of FIG. 6, the agent server 1 outputs a message whose urgency is high to the family message-board server 2 within a predetermined time period after the agent server 1 detects that a member posts a message on the family message board, specifically, immediately after the agent server 1 obtains the posting state of "existence of message(s)". By posting a message whose urgency is high within the predetermined time period after the member posts a message, i.e., by posting a message at a timing at which members are likely to watch the family message board, it is possible to reduce a possibility of overlooking a message whose urgency is high.

Note that, for example, the posting timing condition table 32 is controlled so that even a message which is "not posted" in the posting state of "existence of message(s)" because urgency of the message is "low" is "posted" when the posting state is changed to "no message". In other words, the posting timing condition table 32 is controlled so that a message which has never been posted does not exist. Note, however, that, in the posting timing condition table 32, there may be existed messages which can be posted in the both posting states of "existence of message(s)" and "no message".

The data of the message urgency definition table 30 and the posting timing condition table 32 described above can be changed by a user.

For example, in the message urgency definition table shown in FIG. 6, in response to situation information indicating the content of "error 1 (run-down battery)", i.e., indicating that an "There is an error state in which a battery of the cleaning robot 5 is run down", urgency of the message is set to "high". However, because the cleaning robot 5 is a self-propelled vacuum cleaner, in a case of the run-down battery, the cleaning robot 5 can return to a power supply facility to charge the battery by itself. Therefore, in a case where members consider that importance of the situation information of the "error 1 (run-down battery)" is low, the members can change the urgency to "low".

In a case where a member wants to check a message whose urgency is "high", which is important, without hurry when the member has enough time, i.e., when the member does not communicate with another member/other members, the contents of the posting timing condition table 32 shown in FIG. 8 may be changed as follows. That is, the members may change the contents so that a message whose urgency is "high" "is posted" in the posting state of "no message".

[Regarding Statement Flow]

The following description will discuss an example where, in response to a predetermined state occurred, the agent server 1 generates a message of situation information sent from the cleaning robot 5 or the home server 3 to the agent server 1 and controls a posting timing of the message.

First, members have registered in advance that, in a case where the cleaning robot 5 or the home server 3 detects occurrence of the predetermined state in the cleaning robot or in other home devices, information on the predetermined state is sent to the agent server 1 via the home server 3. Because such registration has been conducted, the cleaning robot 5 or the home server 3 sends information on the predetermined state as situation information to the agent server 1 via the home server 3 when the cleaning robot 5 or the home server 3 detects occurrence of predetermined state in the cleaning robot 5 and other home devices. The above "predetermined state" may be, for example, a state of the cleaning robot 5, such as a state in which "The cleaning robot 5 cannot move", and a state in a house, such as a state in which "the room temperature is 35° C. or more". That is, the "predetermined state" only needs to be a state that the cleaning robot 5 or other home devices can detect.

Those states, which can be detected by the cleaning robot 5 and other home devices, are registered as opportunities to send situation information in the cleaning robot 5 or in the home server 3, so that, when the predetermined state occurs, situation information on the predetermined state is sent to the agent server 1.

Information which is sent to the agent server 1 when the predetermined state occurred may include not only situation information on the predetermined state but also information regarding the predetermined state. For example, in a case where the error state in which the cleaning robot 5 "runs on to a step and cannot move" is detected, not only situation information indicating that the cleaning robot 5 "runs on to a step and cannot move" but also information on "A travel distance and a dust suction amount until the cleaning robot 5 cannot move" may be sent together. Further, in a case where the air conditioning device 6 detects that a "The room temperature is 35° C. or more", not only situation information indicating that the "The room temperature is 35° C. or more" but also information on an "operation state of the air conditioner" may be sent to the agent server 1 together.

Figure 5:
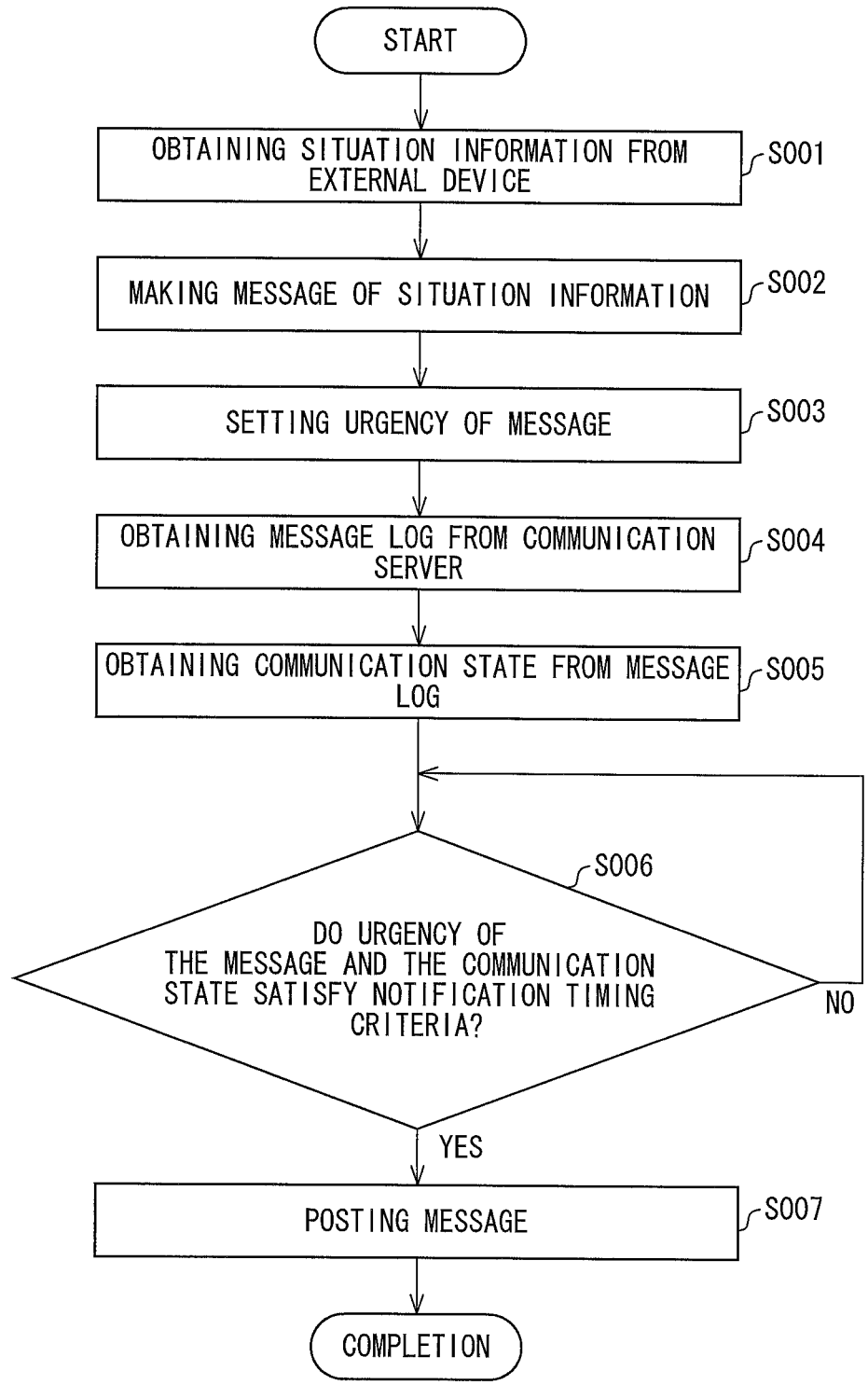
FIG. 5 is a flowchart showing a flow of processes of the agent server of FIG. 1.

The following description will discuss a flow of processes of the agent server 1 with reference to a flowchart of FIG. 5 and an example screen of FIG. 4. A presupposed situation of this is the situation of FIG. 3. That is, the following description will discuss an operation of the agent server 1 when the cleaning robot 5 detects the error state of the "error 2 (the cleaning robot 5 runs on to a step and cannot move)" and sends information on the predetermined state as situation information to the agent server 1. Note that the information sent to the agent server 1 is assumed to have not only the situation information of the "error 2 (the cleaning robot 5 runs on to a step and cannot move)" but also information "Travel distance: 300 m, Dust suction amount: 10/100".

FIG. 5 is a flowchart showing a flow of processes of the agent server of FIG. 1 which states in place of the cleaning robot 5.

As shown in FIG. 5, first, the situation information obtaining section 20 obtains situation information from the cleaning robot 5 (external device) (S001). In other words, the situation information obtaining section 20 obtains the situation information of the "error 2 (the cleaning robot 5 runs on to a step and cannot move)" and the information of "Travel distance: 300 m, Dust suction amount: 10/100" from the home server 3.

The message generation section 21 generates a message of the situation information (S002).

In response to the message generated by the message generation section 21, the message urgency setting section 22 sets, on the basis of the message urgency definition table 30, urgency corresponding to the situation information based on which the message is generated (S003). FIG. 7 shows an example of the message transitory memory table 31 which stores a combination of the message and the urgency of the message set by the message urgency setting section 22.

Next, the message log obtaining section 23 obtains a message log from the family message-board server 2 (communication server) (S004).

The posting state obtaining section 24 obtains a posting state of the message posted on the family message board by the members, such as, for example, existence or nonexistence of messages, from the message log obtained by message log obtaining section 23 (S005). In the example situation shown in FIG. 3, the posting state obtaining section 24 detects a message "Dad, what time will you come home today?" posted by Mom.

Note that, in this embodiment, the posting state obtaining section 24 obtains the posting state of the messages on the family message board by the family members from the message log that the message log obtaining section 23 has obtained from the family message-board server 2. Alternatively, the family message-board server 2 may determine the posting state of the messages on the family message board by the members on the basis of the message log, and the posting state obtaining section 24 may obtain the posting state directly from the family message-board server 2.

Thereafter, the posting timing determination section 25 determines a posting timing of a message on the basis of urgency of the message and the posting state with reference to the posting timing condition table 32. Specifically, the posting timing determination section 25 verifies whether or not a message to be posted by the agent server 1 satisfies notification timing criteria of messages (S006). In other words, the posting timing determination section 25 determines a posting timing of the message stored in the message transitory memory table 31 with reference to the posting timing condition table 32 on the basis of the urgency of the message and the posting state obtained by the posting state obtaining section 24.

Therefore, in the example shown in FIG. 3, the posting timing determination section 25 determines the notification timing of the message of the situation information on the "error 2 (the cleaning robot 5 runs on to a step and cannot move)" as below.

That is, the urgency of the message corresponding to the message of the situation information on the "error 2 (the cleaning robot 5 runs on to a step and cannot move)", which is stored in the message transitory memory table 31, is "high". Further, as shown in FIG. 8, the posting timing condition table 32 defines that a message whose urgency is "high" is not posted in the posting state of "no message" and is posted at the timing of the "existence of message(s)". Therefore, the posting timing determination section 25 does not post the message whose urgency is "high" while the posting state obtaining section 24 obtains the posting state of "no message" (No in S006). When the posting state obtaining section 24 detects the message "Dad, what time will you come home today?" posted by Mom, i.e., obtains the posting state of "existence of message(s)", the posting timing determination section 25 operates as follows. That is, the posting timing determination section 25 determines a posting timing of the message of the situation information on the "error 2 (the cleaning robot 5 runs on to a step and cannot move)" to a timing immediately after the message "Dad, what time will you come home today?" posted by Mom (Yes in S006).

Then, the message display section 26 outputs the message generated by the message generation section 21 to the family message-board server 2 at the posting timing determined by the posting timing determination section 25, and causes the message to be displayed on the family message board (S007). In other words, the message display section 26 sends the message of the situation information on the "error 2 (the cleaning robot 5 runs on to a step and cannot move)" to the family message-board server 2 at a timing immediately after the message "Dad, what time will you come home today?" is posted by Mom. As a result, a screen of the family message board to be displayed on the mobile terminal 4 of each member is shown in FIG. 4.

In the above description, after obtaining of the situation information, making of the message, and setting of the urgency (S001 to S003), the posting state of messages on the family message board by the members is obtained (S004 and S005). However, the agent server 1 may obtain the posting state of messages by the members on the family message board before the message is made and the urgency is set. That is, the agent server 1 only needs to obtain urgency of a message and a posting state before the posting timing determination section 25 determines a posting timing of the message. The order of obtaining the urgency of the message and the posting state may be reversed.

Note that the above description has discussed the example where the predetermined state occurs in the cleaning robot 5 and the cleaning robot 5 notifies the agent server 1 of the predetermined state. However, the present invention is not limited thereto, and the agent server 1 can execute an operation similar to the above example also in a case where the cleaning robot 5 detects that a predetermined state occurs in other home devices and notifies the agent server 1 of the predetermined state of the other home devices.

The agent server 1 can post a message on the family message board at an effective timing in accordance with a posting state of messages on the family message board by members and urgency of the message to be posted.

[Contents of Message]

The message generation section 21 generates the message of the situation information that the situation information obtaining section 20 has obtained from the external device. Therefore, contents of the message generated by the message generation section 21 are not particularly limited, provided that the contents are information that can be generated, maintained, obtained, or detected by the external device. For example, the message generation section 21 can generate messages of information on a room temperature, humidity, and brightness in a house, and a state of other household appliances (such as air conditioning device 6, illumination device 7, refrigerator 8, and PC 9).

In a case where the agent server 1 posts a message on the family message board in place of the cleaning robot 5, as contents of the message generated by the message generation section 21, the following contents are particularly cited. Specifically, the contents of the message can be a travel distance, a travel time, and a dust suction amount of the cleaning robot 5 from the start of cleaning until a current time and an error state of the cleaning robot 5 (whether or not an error occurs, how many times the error occurs).

Further, the contents of the message can be also a current operation state, such as "The cleaning robot 5 is moving now", "The cleaning robot 5 has returned to a dock", "The cleaning robot 5 is cleaning now", and "The cleaning robot 5 stopped because of an error", and a current state in a room (temperature, humidity, brightness, and a state of other home devices).

In other words, as the message, only contents of a current operation (e.g., cleaning) may be generated, or information that the external devices and a service itself can obtain may be generated together with the content. That is, the cleaning robot 5 may take a picture of a floor before cleaning is started and may take again after the cleaning is started, and may send, as the situation information, those two pictures together to the agent server 1.

The contents of the message may be determined in advance or may be selected and changed by the members. In other words, the contents of the message may be only important contents such as items which were determined in advance, (e.g., among state contents of the cleaning robot 5, only important contents such as an error state etc.) or may be contents that the members selected or changed. For example, in FIG. 2, the cleaning robot 5 obtains information indicating that the "The room temperature is 25° C.". However, the cleaning robot 5 (practically, home server 3) may send only situation information on the "error 2 (the cleaning robot 5 runs on to a step and cannot move)" and may not send the information indicating that the "The room temperature is 25° C.". Further, even in a case where the cleaning robot 5 outputs not only the situation information of the "error 2 (the cleaning robot 5 runs on to a step and cannot move)" but also the information indicating that "The room temperature is 25° C." to the agent server 1, the agent server 1 can exclude the information indicating that the "The room temperature is 25° C." from the message of the "error 2".

Embodiment 2

In the above description, there has been described the example where, in a case where the cleaning robot 5 or the home server 3 detects occurrence of a predetermined state in the cleaning robot 5 and other home devices, information on the predetermined state is sent to the agent server 1 via the home server 3.

However, the agent server 1 is not a device only for controlling a posting timing of a message of situation information sent in response to the occurrence of the predetermined state. The following description will discuss an example where the agent server 1 controls a posting timing of a message of situation information at a predetermined point of time, which message is sent from the external devices such as the home server 3.

That is, the agent server 1 is configured to cause the situation information obtaining section 20 (situation information obtaining means) to obtain the situation information at a predetermined point of time. Then, the agent server 1 can notify the members of the message of the situation information at the predetermined point of time at an effective timing in consideration of urgency of the message and a state of users.

The following description will discuss an example where situation information at a predetermined point of time is sent to the agent server 1, which predetermined point of time is specified by the members, and the agent server 1 controls a posting timing of a message of situation information at the predetermined point of time.

Note that "a predetermined point of time" of the wording "situation information at a predetermined point of time" may include not only a point of time specified by the members, but also a point of time preset in the external device such as the cleaning robot 5. The following example will be discussed, assuming that the members set the cleaning robot 5 or the home server 3 so that a state of the cleaning robot (standby, walking, walking is finished, etc.) at 3:00 PM is notified to the members. The cleaning robot 5 (practically, the home server 3) sends, to the agent server 1, the situation information of the "state of the cleaning robot 5 (standby, walking, walking is finished, etc.) at 3:00 PM" as soon as it becomes 3:00 PM on the basis of the setting by the members. Note, however, that, for example, a case of controlling a posting timing of a message of situation information on a state of the cleaning robot 5 after 15 minutes have passed since the cleaning robot 5 started cleaning is also a posting timing to be controlled as a posting timing of a message of the "situation information at a predetermined point of time" described in this embodiment.

Figure 9:
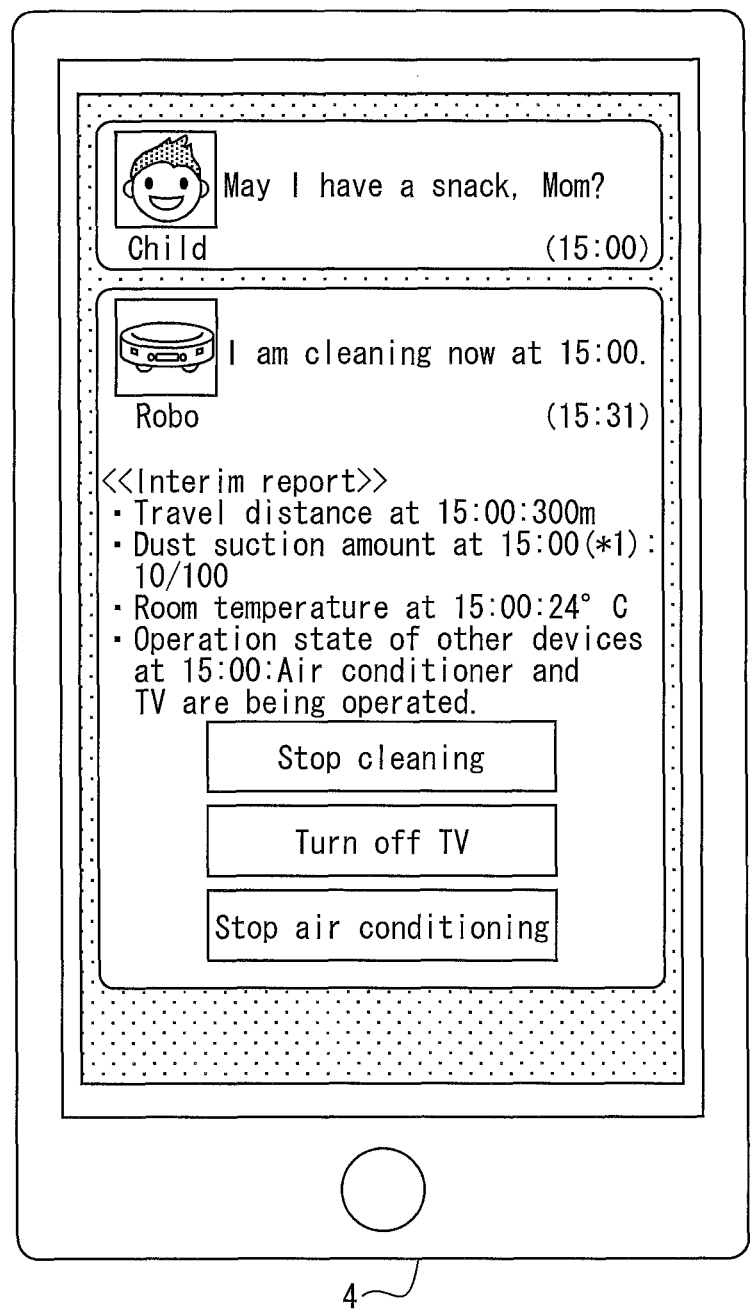
FIG. 9 is a view illustrating an example screen of a family message board which is displayed by sending, at a timing at which no member posts a message on the family message board, a message about situation information on a situation at a predetermined point of time to the family message-board server with use of an agent server according to another embodiment of the present invention.

FIG. 9 is a view illustrating an example screen of the family message board which is displayed by sending, at a timing at which no member posts a message on the family message board, a message about situation information on a situation at a predetermined point of time (e.g., 3:00 PM) to the family message-board server with use of the agent server 1. Note that, in the example screen of FIG. 9, a message indicating that "May I have a snack, Mom?" is posted by Child at 3:00 PM. Meanwhile, the robot (cleaning robot 5) posts a message indicating that "I am cleaning now at 3:00 PM" at a timing at which no family member posts messages on the family message board. In other words, the message indicating that "I am cleaning now at 3:00 PM" is posted at a timing at which no family member posts messages for a predetermined time period (e.g., 30 minutes) after Child posted the message. The following description will discuss the example screen of FIG. 9 in detail.

First, the cleaning robot 5 detects a state of the cleaning robot 5 itself and a situation at 3:00 PM, and sends a result of detection to the agent server 1 via the home server 3. Here, the description will be discussed assuming that the cleaning robot 5 sends a message indicating that "I am cleaning now." as situation information. Further, it is also assumed that the cleaning robot 5 sends the message together with information indicating that "Travel distance: 300 m, Dust suction amount: 10/100, Room temperature: 24° C., Operation state of other devices: Air conditioner and television are being operated".

Thereafter, the situation information obtaining section obtains the situation information, and the message generation section 21 generates a message of the situation information. Then, the message urgency setting section 22 sets "low" as urgency of the message on the basis of the message urgency definition table 30 of FIG. 6.

The posting state obtaining section 24 obtains, from a message log that the message log obtaining section 23 has obtained, a posting state of messages on the family message board by the members.

Then, the posting timing determination section 25 determines a posting timing of the message on the basis of the posting timing condition table 32 of FIG. 8 with use of the urgency of the message and the posting state. In other words, the posting timing determination section 25 determines on the basis of FIG. 8 to post a message indicating that "I am cleaning now." whose urgency is "low" at a timing of "no message".

Therefore, in a case where the posting state obtaining section 24 obtains the posting state in which no member has posted messages for a predetermined time period (e.g., for 30 minutes) after the message indicating that "May I have a snack, Mom?" was posted at 3:00 PM, the posting timing determination section 25 controls the posting timing so that the message indicating that "I am cleaning now." is posted at a timing at which the posting state obtaining section 24 obtained the posting state. In other words, the posting timing determination section 25 determines the posting timing of the message whose urgency is "low" to 3:31 PM at which the posting state obtaining section 24 obtains the posting state in which "messages have not been posted on the family message board for 30 minutes since the member posted the message at 3:00 PM".

As a result, as shown in FIG. 9, on the family message board to be displayed on a screen of the mobile terminal 4 of each member, the message of the situation information at 3:00 PM from Robo is posted at 3:31 PM at which 30 minutes have passed since the last message was posted.

Note that, as described above, for example, the same applies to a case where the cleaning robot 5 (practically, home server 3) notifies the agent server 1 of a state of the cleaning robot 5 after 15 minutes have passed since the cleaning robot 5 started cleaning. That is, the agent server 1 posts a message of the "state of the cleaning robot 5 after 15 minutes have passed since the cleaning robot 5 started cleaning" on the family message board at a timing in consideration of the urgency of the message and the posting state of messages on the family message board by the members.

In this embodiment, if the members set a predetermined point of time, the external devices output situation information at the predetermined point of time to the agent server 1. The agent server 1 notifies the members of a message of situation information on a situation at the predetermined point of time at an effective timing in consideration of urgency of the message and a state of users. In other words, the agent server 1 can be configured so that, even if the agent server 1 obtains situation information on a situation at a predetermined point of time, the agent server 1 does not post a message of the situation information on the situation at the predetermined point of time on the family message board immediately after the predetermined point of time.

Embodiment 3

The agent server 1 which has been discussed in the above is configured to control a posting timing of a message of situation information outputted due to occurrence of a predetermined state by the external devices such as the home server 3 or to control a posting timing of a message of situation information outputted at a predetermined point of time. However, in a family message-board system to which a message notification device according to one embodiment of the present invention is applied, it is not essential for the external devices such as the home server 3 to output the situation information due to the occurrence of the predetermined state or at the predetermined point of time.

That is, the agent server 101 according to another embodiment of the present invention includes the configuration of the agent server 1, and further the agent server 101 comprises report message posting instruction detection means for detecting, in a message posted by one of the members on the communication service, a report message posting instruction which instructs posting of the message of the situation information on the communication service; the situation information obtaining means obtains the situation information corresponding to the report message posting instruction; and the agent server 101 comprises message urgency renewal means for setting, to high, the urgency associated with the situation information which has been obtained by the situation information obtaining means in response to the instruction by the report message posting instruction detection means.

According to the above configuration, in response to a posting instruction from a member, the agent server 101 obtains situation information corresponding to the instruction, thereby generating a message of the situation information. Then, the agent server 101 sets urgency of the message to high, and posts the message on the family message board at an effective timing in accordance with the urgency of the message and a posting state of messages on the family message board by the members. In other words, the agent server 101 can set urgency of a message of information that the members want to know to high, and post the message at a timing in consideration of a state of the members.

Figure 10:
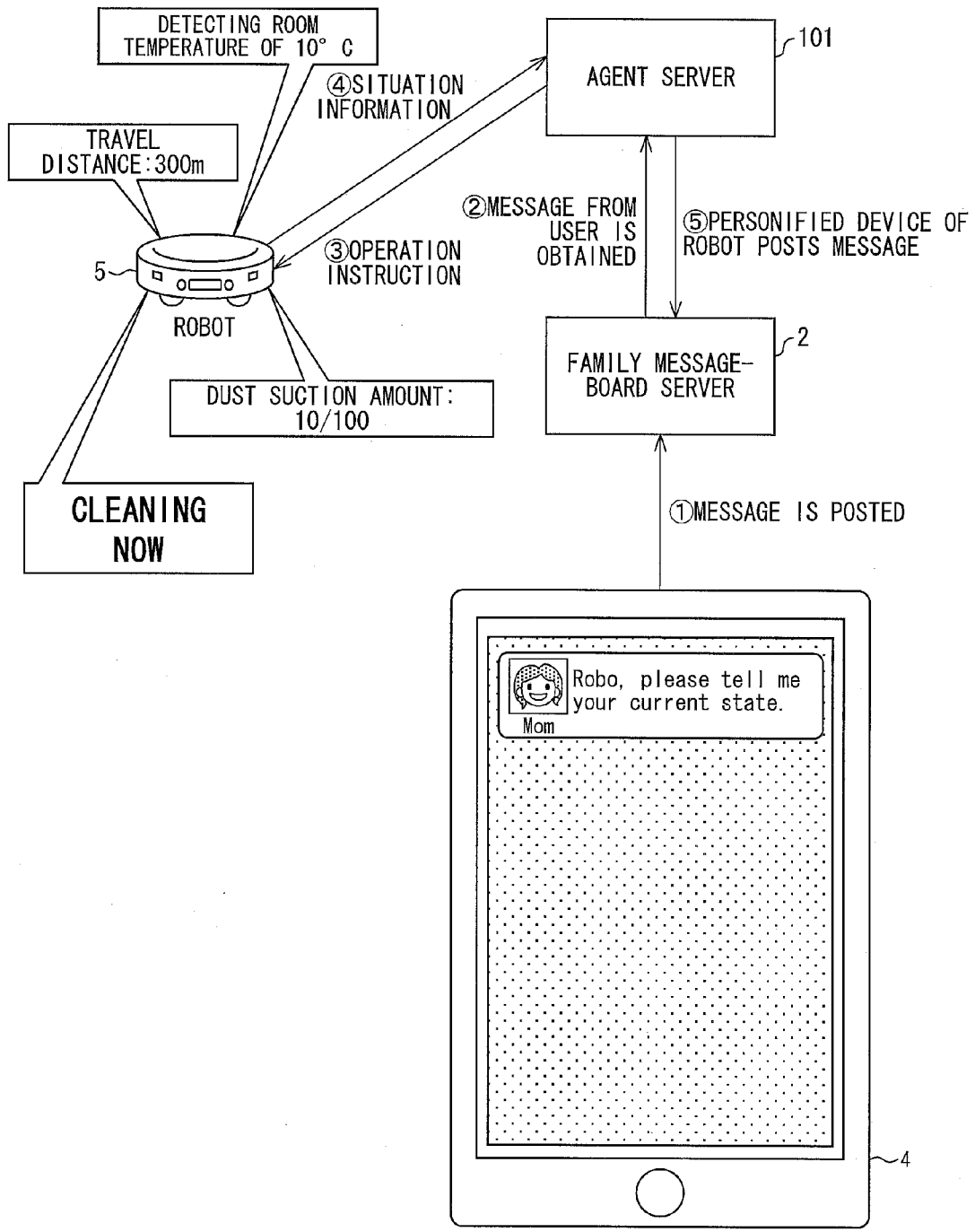
FIG. 10 is a view illustrating a state in which an agent server according to still another embodiment of the present invention detects that a report message posting instruction has been posted on a family message board and obtains situation information.

FIG. 10 is a view illustrating a state in which the agent server 101 detects that a report message posting instruction has been posted on the family message board and obtains situation information.

Figure 11:
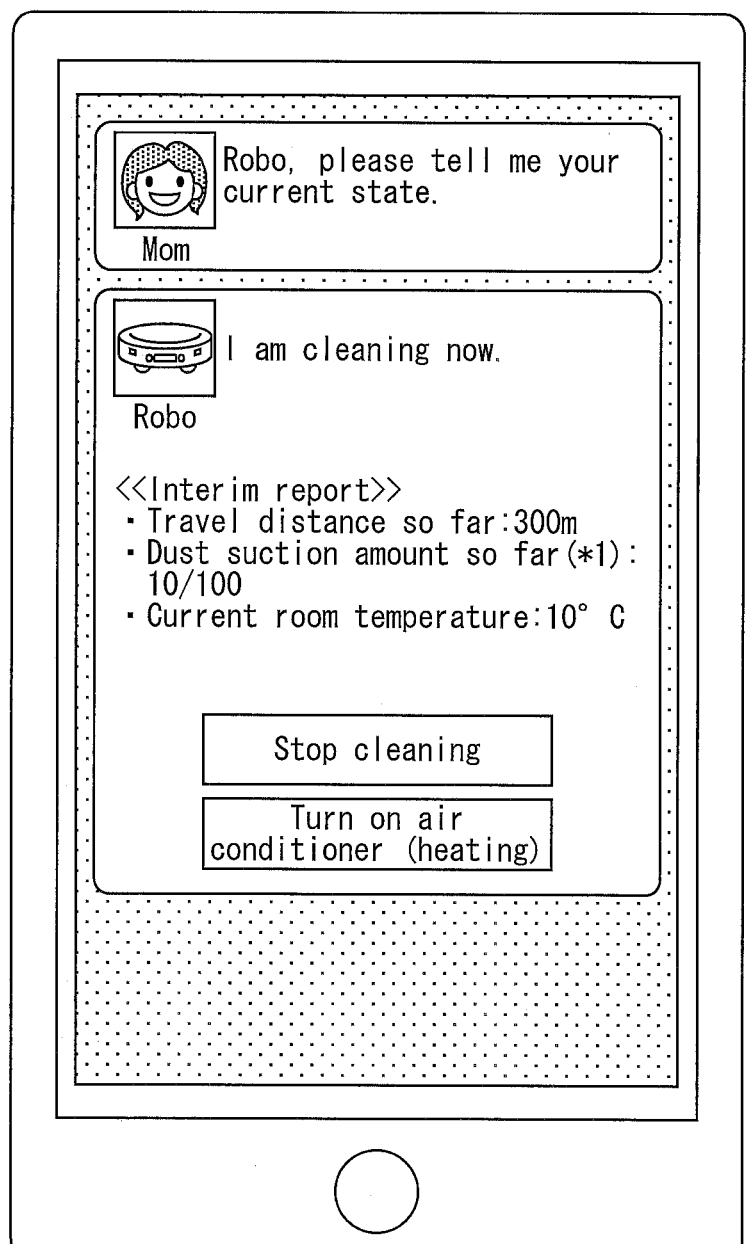
FIG. 11 is a view illustrating an example screen of a family message board displayed after the situation of FIG. 10 on a mobile terminal of each member.

FIG. 11 is a view illustrating an example screen of the family message board displayed after the situation of FIG. 10 on the mobile terminal 4 of each member.

Figure 12:
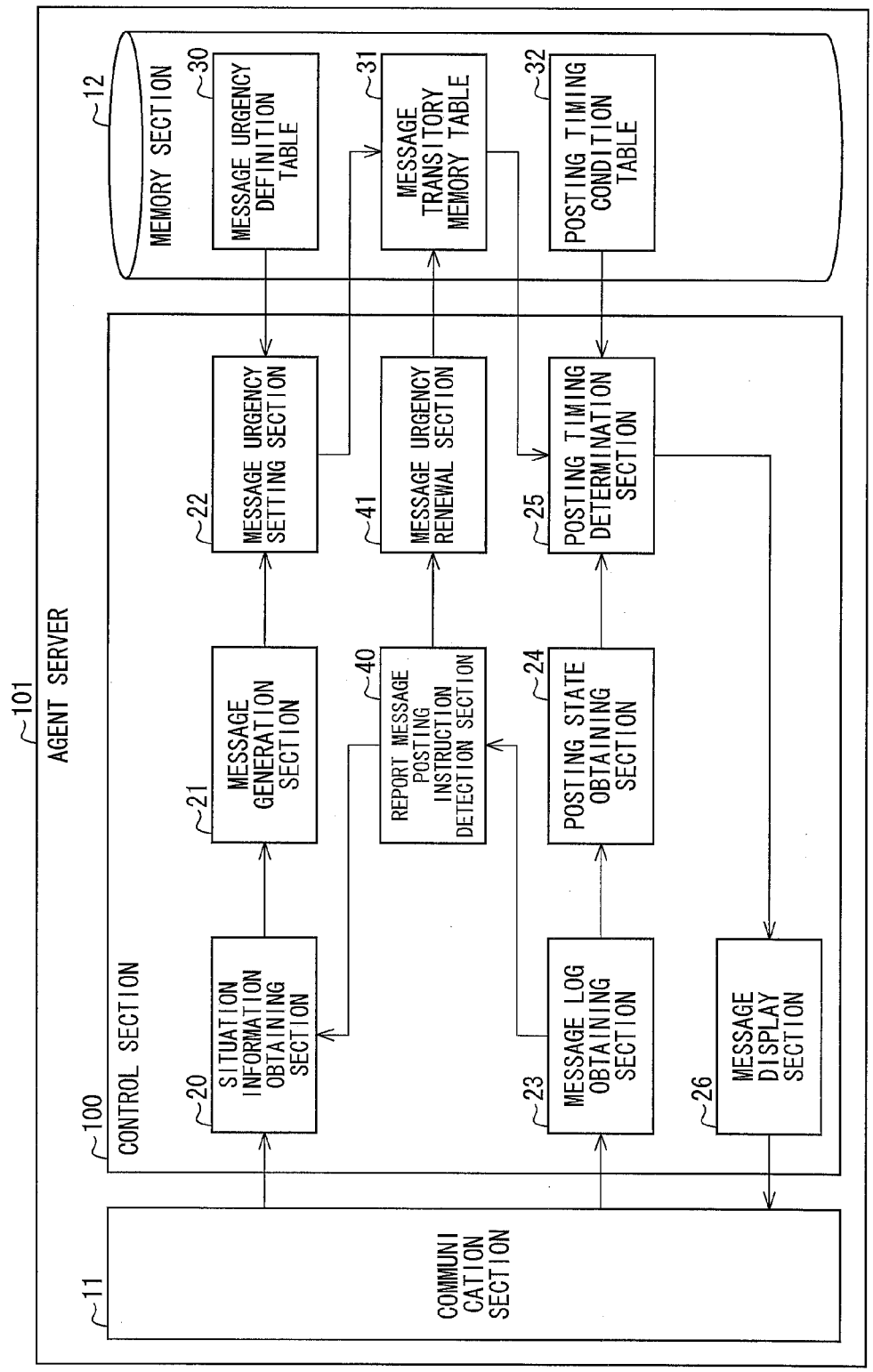
FIG. 12 is a block diagram illustrating an example main configuration of the agent server of FIG. 10.

FIG. 12 is a block diagram illustrating an example main configuration of the agent server 101.

Figure 13:
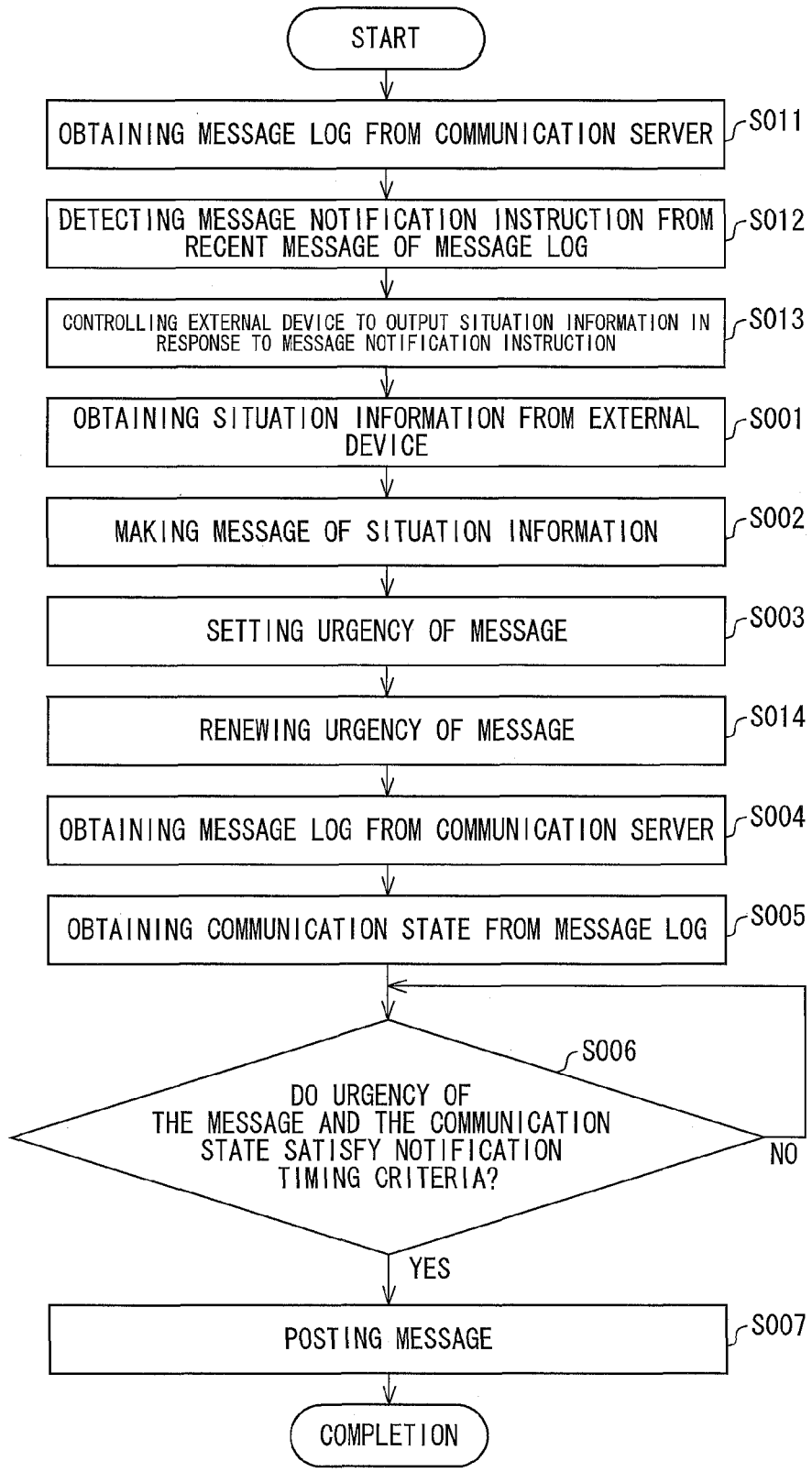
FIG. 13 is a flowchart showing a flow of processes of the agent server of FIG. 10.

FIG. 13 is a flowchart showing a flow of processes of the agent server 101.

First, the following description will discuss function sections that the agent server 101 further includes in addition to the configuration of the agent server 1 and main points of functions of the situation information obtaining section 20 and the posting timing determination section 25.

The report message posting instruction detection section 40 detects, among recent messages which are posted by the members and obtained by the message log obtaining section 23, a report message posting instruction which instructs posting of a message of situation information on the family message board.

The situation information obtaining section 20 obtains situation information corresponding to the report message posting instruction detected by the report message posting instruction detection section 40.

In response to the instruction from the report message posting instruction detection section 40, the message urgency renewal section 41 sets urgency of the message of the situation information, obtained by situation information obtaining section 20, to high.

The posting timing determination section 25 determines a notification timing of the message generated by the message generation section 21 to a posting timing of the message, the posting timing of the message having been associated in advance with a combination of a posting state and urgency associated with the situation information based on which the message is generated, the posting state being obtained by the posting state obtaining section 24. Here, the situation information based on which the message is generated by the message generation section 21 is set to high by the message urgency renewal section 41. Therefore, the posting timing determination section 25 determines the notification timing of the message on the basis of (i) the "high" urgency, which is set by the message urgency renewal section 41 with respect to the situation information based on which the message is generated, and (ii) the posting state.

Note that functions of the message generation section 21, the message urgency setting section 22, the message log obtaining section 23, and the posting state obtaining section 24, which both the agent server 1 and the agent server 101 include, are similar to those described in the agent server 1, and therefore the description of the functions will be omitted.

The following description will discuss a flow of processes of the agent server 101 with reference to the flowchart of FIG. 13 and the example screen of FIG. 11. Note, however, that the flow of the processes of the agent server 101 is largely similar to the processes of the agent server 1, so that differences between the processes of the agent server 101 and the processes of the agent server 1 will be mainly described.

The differences between the processes of the agent server 101 of FIG. 13 and the processes of the agent server 1 of FIG. 5 are only two points below. Specifically, as a first difference, processes of S011 to S013 are added before the process in which "situation information is obtained from an external device" in S001. As a second difference, a process in S014 is added after the process in which "the message urgency setting section 22 sets urgency of a message" in S003.

The following description will discuss the processes in S011 to S013 and S014 in detail.

First, as shown in FIG. 10, Mom posts a message indicating that "Robo, please tell me your current state" on the family message board with use of the mobile terminal 4.

The message log obtaining section 23 obtains a message log from the family message-board server 2 (communication server) (S011). Then, the report message posting instruction detection section 40 detects, on the basis of the message log, among messages posted by the members, a report message posting instruction which instructs posting of a message of situation information on the family message board (S012). That is, the report message posting instruction detection section 40 detects from the message posted by Mom a report message posting instruction which instructs posting of a message indicating "which state the cleaning robot 5 is at present" on the family message board.

Then, the situation information obtaining section 20 controls the external device to output situation information corresponding to the report message posting instruction detected by the report message posting instruction detection section 40 (S013), and obtains the situation information from the external device (S014). That is, the situation information obtaining section 20 controls the cleaning robot 5 (practically, home server 3) to output situation information on "which state the cleaning robot 5 is at present" to the agent server 1.

Note that the cleaning robot 5 (practically, home server 3) may output, to the agent server 1, only the information on "which state the cleaning robot 5 is at present", or may output the information together with another information. Specifically, the external device may send only situation information in response to the report message posting instruction to the agent server 1, or may send the situation information together with information which relates to the situation information to the agent server 1. In this embodiment, the cleaning robot 5 (practically, home server 3) sends, to the agent server 1, not only situation information indicating that "I am cleaning now." but also information which was detected by the cleaning robot 5 immediately before the cleaning robot 5 sends the situation information. Specifically, the cleaning robot 5 sends information indicating that "Travel distance from start of cleaning: 300 m, Dust suction amount: 10/100, Current room temperature: 10° C." together with the situation information to the agent server 1.

The processes in which the situation information outputted from the external device is obtained (S001), in which the message of the situation information is made (S002), and in which the urgency of the message is set (S003) are similar to those of the agent server 1. Specifically, as shown in FIG. 6, the urgency associated with the situation information indicating that "I am cleaning now." is "low" in the message urgency definition table 30. Therefore, the message urgency setting section 22 causes the message transitory memory table 31 to store a combination of the message of the situation information indicating that "I am cleaning now." and "low" which is the urgency of the message.

Thereafter, in response to the instruction from the report message posting instruction detection section 40, the message urgency renewal section 41 sets the urgency of the situation information obtained by the situation information obtaining section 20 to high (S014). Specifically, the message urgency renewal section 41 sets the urgency of the situation information indicating that "I am cleaning now." to high in response to the message indicating that "Robo, please tell me your current state" from Mom. In other words, the urgency of the message of the situation information indicating that "I am cleaning now." stored in the message transitory memory table 31 is renewed to be "high".

After that, the posting timing determination section 25 determines a posting timing of the message on the basis of the posting timing condition table 32 with use of the urgency of the message and the posting state that the posting state obtaining section 24 obtained (S006).

That is, the message of the situation information indicating that "I am cleaning now." stored in the message transitory memory table 31 is associated with "high" as the urgency of the message. Further, the posting timing condition table 32 of FIG. 8 defines that the message whose urgency is "high" is posted at a timing of "existence of message(s)". Therefore, the posting timing determination section 25 determines the posting timing of the message of situation information indicating that "I am cleaning now." as a timing at which the posting state obtaining section 24 has detected that a member posted a message on the family message board. Here, immediately before the agent server 101 obtains the situation information indicating that "I am cleaning now.", the posting state obtaining section 24 obtained a posting state in which the message indicating that "Robo, please tell me your current state" from Mom was posted on the family message board. Therefore, the posting timing determination section 25 determines that the message of situation information indicating that "I am cleaning now." is posted immediately after the message indicating that "Robo, please tell me your current state" from Mom.

Then, the message display section 26 outputs, to the family message-board server 2, the message generated by the message generation section 21 at the posting timing that the posting timing determination section 25 has determined, to thereby display the message on the family message board (S007). In other words, at the timing immediately after the message indicating that "Robo, please tell me your current state" from Mom is posted, the message display section 26 sends the message of the situation information indicating that "I am cleaning now." to the family message-board server 2. In this case, the situation information may be sent together with information indicating that "Travel distance from start of cleaning: 300 m, Dust suction amount: 10/100, Current room temperature: 10° C.". As a result, the screen on the family message board of the mobile terminal 4 of each member is as shown in FIG. 11.

Note that the above description has discussed a case where the urgency of the message of the situation information obtained in response to the report message posting instruction by the member is set to "high". However, the agent server 101 can also set urgency of a message of situation information obtained at a specified time to "high".

Embodiment 4

As described above, situation information of a message which is sent by the agent servers 1 and 101 means general information that the agent servers 1 and 101 can directly obtain from external devices such as the family message-board server 2, the home server 3, and the information provision server 3a. Further, the situation information includes not only information that the agent servers 1 and 101 can obtain directly from those external devices but also information that the agent servers 1 and 101 can obtain via the external devices.

That is, in the agent server 1 and the agent server 101, the situation information includes at least one of (A) an operation state of the external devices immediately before the situation information obtaining section 20 (situation information obtaining means) obtains the situation information from the external devices, (B) an operation progress of the external device immediately before the situation information obtaining section 20 obtains the situation information from the external device, and (C) a measurement value regarding an environment surrounding the external device that the external device obtains.

The agent servers 1 and 101 can make a message during an operation of the external device, i.e., for example, a message of an operation progress etc. of the cleaning robot 5.

Specifically, it is possible to make a message about a change in cleaning robot 5 itself and a change in environment surrounding the cleaning robot 5 during a period from start of the cleaning to a time immediately before the situation information obtaining section 20 obtains situation information from the cleaning robot 5 (practically, home server 3). The message is, for example, a travel distance in this cleaning, the number of times of errors occurred this time, etc.

Figure 14:
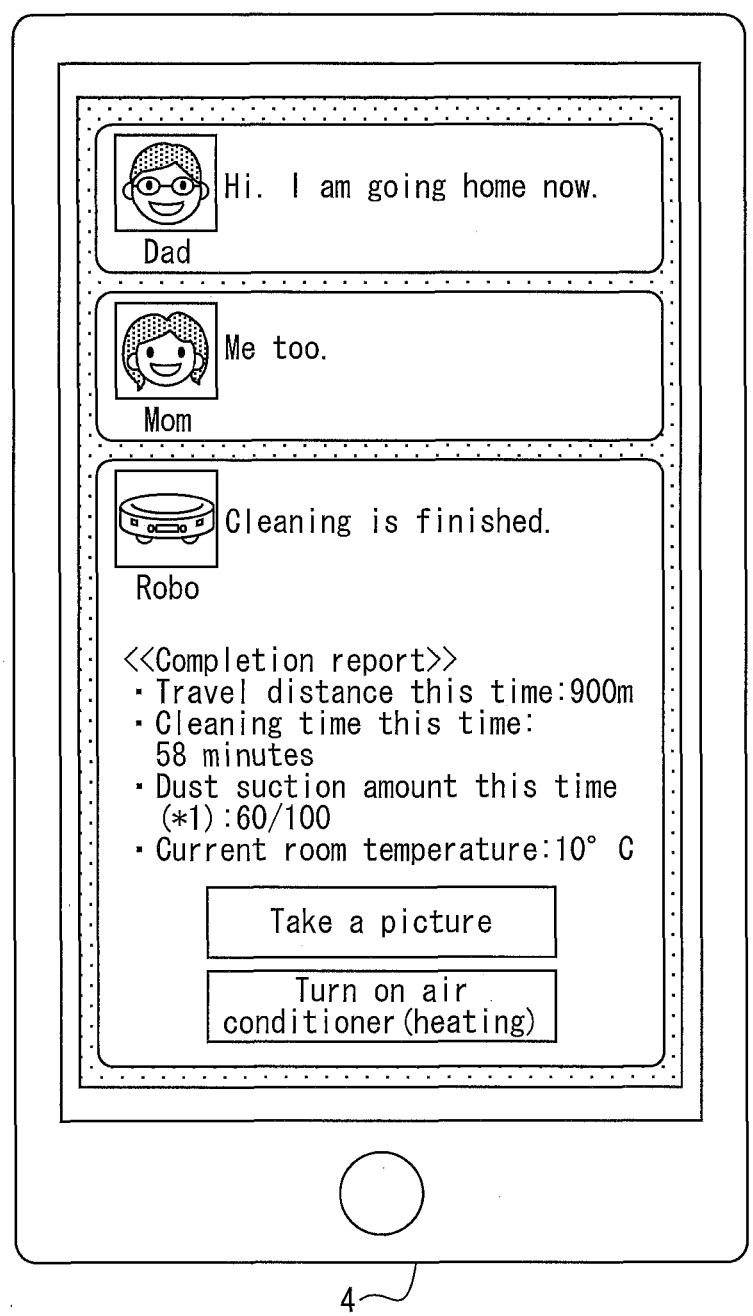
FIG. 14 is a view illustrating an example screen of a family message board which is displayed by sending, after a member posted a message on the family message board, a message about situation information on a situation after completion of an operation of a cleaning robot to the family message-board server with use of an agent server according to yet still another embodiment of the present invention.

Further, as shown in FIGS. 9, 11, and 14, in a case where the agent servers 1 and 101 post a message of situation information of an external device while the external device is being operated, the message includes a button for operating the external device. In other words, for example, a message of information regarding cleaning includes, for example, a button of "stop cleaning" so that the members can operate the external device regarding displayed contents.

That is, in the agent server 1 and the agent server 101, the message generation means generates a message including not only situation information but also operation assisting information for the members to operate the external device.

Then, the members can operate the external device on a mail reply screen of the message including the operation assisting information.

The agent server 1 and the agent server 101 notify, for example, the members of a message indicating that "a suction amount from the start of cleaning in this time is less than that in the previous time" and displays a button to stop cleaning in the message while the cleaning robot 5 is cleaning.

Then, in a case where a member thinks that "the cleaning should be stopped because the suction amount from the start of cleaning in this time is less than that in the previous time", the member pushes the button in the message to remotely stop cleaning of the cleaning robot 5.

In this case, for example, by analyzing of a cleaning travel distance, a cleaning time period, and a suction amount, notifying the members that the suction amount from start of cleaning today is less than that at the same time yesterday, and then presenting the "button to stop cleaning", the agent server 1 or 101 can give the members a chance to "notice".

In other words, the members can determine that, if the suction amount is small, an amount of dust is probably small, so that it is unnecessary to clean the room. Further, by presenting the "button" to stop cleaning, the members think more clearly that cleaning with use of the cleaning robot 5 should be "stopped".

After the operation of the external device is completed, for example, after the cleaning by the cleaning robot 5 is completed, the agent servers 1 and 101 make a message of a result of the operation of the cleaning robot 5.

FIG. 14 is a view illustrating an example message of situation information on a situation after completion of cleaning by the cleaning robot 5, which example message has been posted by the agent server 1 or 101 on the family message board.

As shown in FIG. 14, the agent servers 1 or 101 posts situation information on the situation after the completion of the cleaning by the cleaning robot 5, i.e., posts a message indicating that "cleaning is completed" on the family message board. Further, the agent server 1 or 101 posts the message including not only the situation information but also information indicating "Travel distance this time: 900 m, Cleaning time this time: 58 minutes, Dust suction amount this time: 60/100, Current room temperature: 10° C.".

In other words, the agent server 1 or 101 can post not only an interim report which is a message of situation information while the external device is operating but also a completion report which is a message of situation information on the situation after the completion of the operation of the external device.

As the message of the situation information on the situation after the completion of the operation of the external device, only information regarding a completed operation (e.g., cleaning) may be displayed, or information that the external device or a service itself can obtain may be displayed together with the information regarding the completed operation. For example, in a case where the suction amount is statistically large, a photographing button and a comment may be displayed to encourage a user to take a picture. For example, as a boasting of the cleaning robot 5, a message indicating that "I cleaned the room very hard, so please take a picture!" is displayed on the family message board. This makes it possible that the members enjoy virtual communication with the cleaning robot 5 like as if the cleaning robot 5 is a member of the family.

Embodiment 5

The following description will discuss a message notification device in accordance with further another embodiment of the present invention. Note that a difference between the message notification device in accordance with this embodiment and the agent server 1 or 101 is a data structure and contents of each table stored in the memory section 12.

FIG. 15 is a view showing a data structure and a specific example of the message urgency definition table 30 which defines a correlation between (i) a posting state by family members on a family message board within a predetermined time period (for example, the most recent 30 minutes) and (ii) a posting state obtained by the posting state obtaining section 24.

FIG. 16 is a data structure and another specific example of the message urgency definition table 30 which is different from that of FIG. 6.

FIG. 17 is a data structure and another specific example of the message urgency definition table 32 which is different from that of FIG. 8.

FIG. 18 is a data structure and another specific example of the message urgency definition table 32 which is different from those of FIG. 8 and FIG. 17.

As the description above, the posting state, which is an element for controlling a posting timing of a message, indicates whether or not messages are posted by the family members on the family message board. However, for the message notification device in accordance with this embodiment, the posting state does not indicate existence or non-existence of messages but indicates frequency of messages posted by the family members on the family message board within a predetermined time period as shown in FIG. 15.

FIG. 15 shows an example posting state definition table in which a posting state (posting frequency) is associated with the number of times of messages posted by the family members on the family message board within the predetermined time period and a posting frequency becomes higher as the number of times of messages becomes higher within the predetermined time period.

In the message notification device in accordance with this embodiment, the posting state obtaining section 24 obtains, from the message log obtaining section 23, a message log which is a history of messages posted by the family members on the family message board. The posting state obtaining section 24 obtains a posting frequency as the posting state from the message log and the posting state definition table.

Note that the posting state, which is obtained by the posting state obtaining section 24 as an element for controlling a posting timing of a message, is not limited to the existence or nonexistence of messages or the posting frequency, and may be any state provided that it indicates a posting state of messages posted by the family members on the family message board. In other words, the posting state for the message notification device in accordance with this embodiment is an event for presuming the state of the family members, so that the posting state only needs to be information which is obtainable from the family message-board server 2.

Note that a method of controlling a posting timing with use of a posting frequency will be described in detail below with reference to FIGS. 17 and 18.

The message urgency definition table 30, in which the message urgency setting section 22 sets, as urgency of a message, urgency associated with situation information based on which the message is generated, is not necessary to be the table shown in FIG. 6. In the message urgency definition table 30 of FIG. 6, "high"/"low" is associated with urgency of situation information, and, in the message notification device in accordance with this embodiment, the message urgency definition table 30 is such a table as shown in FIG. 16. That is, FIG. 16 shows a data structure and a specific example of the message urgency definition table 30 in which urgency of "0" to "4" is associated with situation information so that the situation information is associated with a larger numerical value as the urgency of the situation information becomes higher.

Further, the posting timing condition table 32, which is used by the posting timing determination section 25 to determine a posting timing of a message on the basis of urgency of the message and a posting state, is not the table shown in FIG. 8. That is, FIG. 8 exemplifies the posting timing condition table 32 which defines whether a message is "posted" or "not posted" with respect to four combinations of existence or nonexistence of messages and urgency of the message. However, the message notification device in accordance with this embodiment is not limited to the posting timing condition table 32 as shown in FIG. 8 but may be the table as shown in FIG. 17.

FIG. 17 shows an example posting timing condition table in which, regarding a timing at which the message is posted, an upper limit and a lower limit of the posting frequency (posting state) are set in accordance with an upper limit and a lower limit of the urgency of the message. Here, the posting frequency (posting state) is denoted by the numerical value "4" as shown in FIG. 15, and the numerical value denoting the posting frequency (posting state) becomes larger as the number of massages posted within a predetermined time period is increased. Further, the situation information is denoted by the numerical values "0" to "4" as shown in FIG. 16, and the numerical value denoting the situation information becomes larger as the urgency of situation information becomes higher. That is, in FIG. 17, the first row means that a message whose urgency is "3" or "4" is posted when the posting frequency falls within a range of "2" to "4". Further, the second row means that a message whose urgency falls within a range of "0" to "2" is posted when the posting frequency is "0" or "1".

In other words, the first row of FIG. 17 means that a message whose urgency is high (i.e., "3" or "4") is posted when the posting frequency is high or other messages are posted (i.e., a range of "2" to "4"). Meanwhile, the second row thereof means that a message whose urgency is low (i.e., a range of "0" to "2") is posted when the posting frequency is low or no message is posted (i.e., is "0" or "1").

FIG. 18 is another expression of the contents of the posting timing condition table of FIG. 8 in forms of the posting timing condition table of FIG. 17. In other words, the first row of FIG. 18 means that a message whose urgency is "1", i.e., whose urgency is "high" is posted only when the posting state is "1", i.e., when the posting frequency is "high" (other messages are posted). Meanwhile, the second row thereof means that a message whose urgency is "0", i.e., whose urgency is "low" is posted only when the posting state is "0", i.e., when the posting frequency is "low" (no message is posted).

As described above, in the message notification device in accordance with this embodiment, the posting state does not always need to indicate whether or not a message is posted, and the urgency does not always need to indicate binary values of "high" and "low".

Modification Example

In the examples above, the agent server 1 is configured to state in place of the cleaning robot 5. However, the agent server 1 can also state in place of other home devices on the assumption that the other home devices in a house are treated as personified devices. For example, in a case where the agent server 1 makes a statement about an event of the refrigerator 8 on the basis of refrigerator stock information as an information source, the agent server 1 can output a message as a character of the refrigerator 8.

Function blocks which are used by the agent server 1 to process messages may be provided in respective personified devices (e.g., cleaning robot 5). In this case, the family message-board server 2 may receive a message from each personified device and may post the message on the family message board as a message from a character of the each personified device.

In the above examples, the description has been discussed with use of the family message board as a communication service for chronologically displaying messages posted by members, however, the communication service only needs to chronologically display messages posted by the members, and may be a communication service that displays chats or e-mails in forms of a thread view.

In the above description, the agent server 1 herein described indicates an apparatus in which function modules or a plurality of devices for executing specific functions are logically assembled, and whether or not the function modules or the devices are placed in a single casing is not particularly limited.

Various storage sections such as the function modules (function blocks) for functioning as the agent server 1, the message urgency definition table 30, the posting timing condition table 32, and the message transitory memory table 31 may be achieved by cloud computing.

Embodiment 6

Control blocks of the agent servers 1 and 101 (particularly, the situation information obtaining section 20, the message generation section 21, the posting state obtaining section 24, the posting timing determination section 25, the message display section 26, the report message posting instruction detection section 40, and the message urgency renewal section 41) may be realized by logic (hardware) formed on an integrated circuit (IC chip) or the like, or may be realized by software with use of a CPU (central processing unit).

In the latter case, each of the agent servers 1 and 101 includes: a CPU that executes instructions of a program that is software for realizing the aforementioned functions; a ROM (read only memory) or a storage device (each referred to as "storage medium") storing the program and various kinds of data in such a form that they are readable by a computer (or a CPU); and a RAM (Random Access Memory) that develops the program in executable form. The object of the present invention can be achieved by a computer (or the CPU) reading and executing the program stored in the storage medium. The storage medium may be "a non-transitory tangible medium" such as a tape, a disc, a card, a semiconductor memory, and a programmable logic circuit. Further, the program may be supplied to or made available to the computer via any transmission medium (such as a communication network and a broadcast wave) which enables transmission of the program. Note that the present invention can also be implemented by the program in the form of a computer data signal embedded in a carrier wave which is embodied by electronic transmission.

SUMMARY

A message notification device (agent server 1) in accordance with an aspect 1 of the present invention includes: posting state obtaining means (posting state obtaining section 24) for obtaining a posting state in a communication service (family message board) for chronologically displaying messages that a member(s) has/have posted; situation information obtaining means (situation information obtaining section 20) for obtaining situation information obtained in an external device; message generation means (message generation section 21) for generating a message of the situation information obtained by the situation information obtaining means; posting timing determination means (posting timing determination section 25) for determining a notification timing of the message generated by the message generation means to a posting timing of the message, the posting timing of the message having been associated in advance with a combination of a posting state and urgency associated with the situation information based on which the message is generated, the posting state being obtained by the posting state obtaining means; and message display means for displaying the message generated by the message generation means on the communication service by outputting, at the posting timing determined by the posting timing determination means, the message to a server which provides the communication service.

A method of processing a statement in accordance with an aspect 9 of the present invention, includes a posting state obtaining step of obtaining a posting state in a communication service for chronologically displaying messages that a member(s) has/have posted; a situation information obtaining step of obtaining situation information obtained in an external device, a message generation step of generating a message of the situation information obtained by the situation information obtaining step; a posting timing determination step of determining a notification timing of the message generated by the message generation step to a posting timing of the message, the posting timing of the message having been associated in advance with a combination of a posting state and urgency associated with the situation information based on which the message is generated, the posting state being obtained by the posting state obtaining step; and a message display step of displaying the message generated by the message generation step on the communication service by outputting, at the posting timing determined by the posting timing determination step, the message to a server which provides the communication service.

According to the above configuration and the method of a message notification device of the present invention, the posting timing determination means controls a posting timing of posting a message on a communication service for chronologically displaying messages posted by members on the basis of urgency of the message and a posting state of messages posted by the members in the service.

Therefore, it is possible to notify the members of a message at an effective timing in consideration of the urgency of the message and a state of the user.

The message notification device in accordance with an aspect 2 of the aspect 1 of the present invention includes: a storage section 12 which stores (i) a message urgency definition table 30 for defining a correlation between the situation information and the urgency of the message of the situation information and (ii) a posting timing condition table 32 in which the message posting timing is associated with the combination of the urgency of the message and the posting state, wherein the posting timing determination means determines, on the basis of the posting timing condition table 32, the posting timing of the message generated by the message generation means to the message posting timing which is associated with the combination of the posting state obtained by the posting state obtaining means and the urgency associated in the message urgency definition table 30 with the situation information based on which the message is generated.

According to the configuration, the posting timing determination means can control a posting timing of posting a message on the communication service for chronologically displaying messages posted by the members on the basis of the urgency associated with the situation information based on which the message is generated in the message urgency definition table 30 and a posting state of messages posted by the members of the service.

Therefore, the members can change the urgency of the message by appropriately changing the association of the situation information with the urgency in the message urgency definition table 30. Further, by appropriately changing a posting timing of the message associated with a combination of the urgency of the message and the posting state in the posting timing condition table 32 on the basis of the urgency of the message and the posting state, the members can select a timing at which the message should be posted on the communication service in accordance with urgency of the message.

In other words, it is possible to post a message on the communication service in accordance with the urgency of the message at a timing selected by the members, which improves usability.

In the message notification device in accordance with an aspect 3 of the aspect 1 or 2 of the present invention, it is preferable that the posting state be a posting frequency within a predetermined time period.

According to the configuration, it is possible to control a posting timing of a message on the basis of a posting state easily obtainable from a server which provides the communication service, i.e., on the basis of posting frequency.

Therefore, it is possible to post a message on the communication service in consideration of a state of the members without a complicated configuration.

In the message notification device in accordance with an aspect 4 in any one of the aspect 1 to 3 of the present invention, it is preferable that the situation information obtaining means obtain the situation information at a predetermined point of time.

According to the configuration, it is possible to notify members of a message of situation information on a situation at a predetermined point of time at an effective timing in consideration of the urgency of the message and a state of a user.

In the message notification device in accordance with an aspect 5 in any one of the aspects 1 to 4 of the present invention, it is preferable that, within a predetermined time period from a time when posting of a message by one of the members on the communication service is detected, a message having high urgency be outputted to the server which provides the communication service.

According to the configuration, in a case of a message whose urgency is high, the message is posted within the predetermined time period after a message by a member was posted, i.e., the message whose urgency is high is posted at a timing at which members are likely to watch the family message board. This makes it possible to reduce a possibility that the message whose urgency is high is overlooked.

In the message notification device (agent server 101) in accordance with an aspect 6 in any one of the aspects 1 to 5 of the present invention, it is preferable that: the message notification device comprise report message posting instruction detection means (report message posting instruction detection section 40) for detecting, in a message posted by one of the members on the communication service, a report message posting instruction which instructs posting of the message of the situation information on the communication service; the situation information obtaining means obtain the situation information corresponding to the report message posting instruction; and the message notification device comprise message urgency renewal means (message urgency renewal section 41) for setting, to high, the urgency associated with the situation information which has been obtained by the situation information obtaining means in response to the instruction by the report message posting instruction detection means.

According to the configuration, when a member posts, on the communication service, a message indicating that he/she wants to know specific information, a message of situation information is posted, as a message whose urgency is high, in response to the message posted by the member at a timing according to a posting state of messages by the members of the service. In other words, a message of information that the member wants to know is set as a message whose urgency is high, and the message can be posted at a timing in consideration of a state of the members.

In the message notification device of an aspect 7 in any one of the aspects 1 to 6 of the present invention, it is preferable that the situation information include at least one of an operation state of the external device at immediately before the situation information obtaining means obtains the situation information from the external device, an operation progress of the external device until a point of time immediately before the situation information obtaining means obtains the situation information from the external device, and a measurement value of an environment surrounding the external device, which measurement value is obtained by the external device.

According to the configuration, it is possible to notify members of various types of situation information at an effective timing in consideration urgency of the situation information and a state of users.

In the message notification device of an aspect 8 in any one of the aspects 1 to 7 of the present invention, it is preferable that the message generation means generate a message in which operation assisting information to be used by the members to operate the external device is added to the message of the situation information.

According to the configuration, the member can operate the external device relating to the contents displayed in the message, so that the members can operate the external device immediately on the basis of the displayed contents.

Note that the message notification device may be realized by a computer, and, in this case, a control program of the message notification device, which realizes the message notification device with use of a computer by operating the computer as each means, and a computer readable recording medium which stores the control program also fall within the scope of the present invention.

The present invention is not limited to the description of the embodiments above, and can be modified in numerous ways by a skilled person as long as such modification falls within the scope of the claims. An embodiment derived from a proper combination of technical means disclosed in different embodiments is also encompassed in the technical scope of the present invention.

INDUSTRIAL APPLICABILITY

A message notification device of the present invention can be widely applied, with use of an electronic communication tool, to various communication systems capable of notifying members of a message of situation information which has been obtained in an external device.

REFERENCE SIGNS LIST

1 Agent server (message notification device)
2 Family message-board server (communication service providing server/external device)
3 Home server (external device)
3a Information providing server (external device)
4a-4c Mobile terminal (communication terminal device)
5 Cleaning robot (personified device/external device)
6 Air conditioning device (external device)
7 Illumination device (external device)
8 Refrigerator (external device)
9 PC (external device)
10 Control section
11 Communication section
12 Storage section
20 Situation information obtaining section (situation information obtaining means)
21 Message generation section (message generation means)
24 Posting state obtaining section (posting state obtaining means)
25 Posting timing determination section (posting timing determination means)
26 Message display section (message display means)
30 Message urgency definition table
32 Posting timing condition table
40 Report message posting instruction detection section (report message posting instruction detection means)
41 Message urgency renewal section (message urgency renewal means)
100 Family message-board system (communication system)
101 Agent server

The invention claimed is:
1. A message notification device, comprising:
posting state obtaining means for obtaining a posting state in a communication service for chronologically displaying messages that a member(s) has/have posted;
situation information obtaining means for obtaining situation information obtained in an external device;
message generation means for generating a message of the situation information obtained by the situation information obtaining means;
posting timing determination means for determining a notification timing of the message generated by the message generation means to a posting timing of the message, the posting timing of the message having been associated in advance with a combination of a posting state and urgency associated with the situation information based on which the message is generated, the posting state being obtained by the posting state obtaining means; and
message display means for displaying the message generated by the message generation means on the communication service by outputting, at the posting timing determined by the posting timing determination means, the message to a server which provides the communication service,
the posting timing determination means determining the notification timing of a message whose urgency is high to a posting timing when a posting frequency is high and not to a posting time when a posting frequency is low.

2. The message notification device as set forth in claim 1, further comprising
a storage section which stores (i) a message urgency definition table for defining a correlation between the situation information and the urgency of the message of the situation information and (ii) a posting timing condition table in which the message posting timing is associated with the combination of the urgency of the message and the posting state,
wherein the posting timing determination means determines, on the basis of the posting timing condition table, the posting timing of the message generated by the message generation means to the message posting timing which is associated with the combination of the posting state obtained by the posting state obtaining means and the urgency associated in the message urgency definition table with the situation information based on which the message is generated.

3. The message notification device as set forth in claim 1, wherein the posting state is a posting frequency within a predetermined time period.

4. The message notification device as set forth in claim 1, wherein the situation information obtaining means obtains the situation information at a predetermined point of time.

5. The message notification device as set forth in claim 1, wherein, within a predetermined time period from a time when posting of a message by one of the members on the communication service is detected, a message having high urgency is outputted to the server which provides the communication service.

6. The message notification device as set forth in claim 1, wherein:
the message notification device comprises report message posting instruction detection means for detecting, in a message posted by one of the members on the communication service, a report message posting instruction which instructs posting of the message of the situation information on the communication service;
the situation information obtaining means obtains the situation information corresponding to the report message posting instruction; and
the message notification device comprises message urgency renewal means for setting, to high, the urgency associated with the situation information which has been obtained by the situation information obtaining means in response to the instruction by the report message posting instruction detection means.

7. The message notification device as set forth in claim 1, wherein:
the situation information includes at least one of
an operation state of the external device at immediately before the situation information obtaining means obtains the situation information from the external device,
an operation progress of the external device until a point of time immediately before the situation information obtaining means obtains the situation information from the external device, and
a measurement value of an environment surrounding the external device, which measurement value is obtained by the external device.

8. The message notification device as set forth in claim 1, wherein the message generation means generates a message in which operation assisting information to be used by the members to operate the external device is added to the message of the situation information.

9. The message notification device as set forth in claim 1, wherein the external device is placed in a space shared by the members of a community.

10. The message notification device as set forth in claim 1, wherein: the external device is a cleaning robot.

11. A method of controlling a message notification device for notifying a message of situation information obtained in an external device, the method comprising:
a posting state obtaining step of obtaining a posting state in a communication service for chronologically displaying messages that a member(s) has/have posted;
a situation information obtaining step of obtaining situation information obtained in an external device,
a message generation step of generating a message of the situation information obtained by the situation information obtaining step;
a posting timing determination step of determining a notification timing of the message generated by the message generation step to a posting timing of the message, the posting timing of the message having been associated in advance with a combination of a posting state and urgency associated with the situation information based on which the message is generated, the posting state being obtained by the posting state obtaining step; and
a message display step of displaying the message generated by the message generation step on the communication service by outputting, at the posting timing determined by the posting timing determination step, the message to a server which provides the communication service,
the posting timing determination step determining the notification timing of a message whose urgency is high to a posting timing when a posting frequency is high and not to a posting time when a posting frequency is low.

12. A recording medium, which is a non-transitory recording medium storing computer readable data serving as a control program for causing a computer to function as a message notification device for notify a message of situation information obtained in an external device, the recording medium storing the control program for causing the computer to execute:
posting state obtaining step of obtaining a posting state in a communication service for chronologically displaying messages that a member(s) has/have posted;
situation information obtaining step of obtaining situation information obtained in an external device,
message generation step of generating a message of the situation information obtained by the situation information obtaining step;
posting timing determination step of determining a notification timing of the message generated by the message generation step to a posting timing of the message, the posting timing of the message having been associated in advance with a combination of a posting state and urgency associated with the situation information based on which the message is generated, the posting state being obtained by the posting state obtaining step; and
message display step of displaying the message generated by the message generation step on the communication service by outputting, at the posting timing determined by the posting timing determination step, the message to a server which provides the communication service, the posting timing determination step determining the notification timing of a message whose urgency is high to a posting timing when a posting frequency is high and not to a posting time when a posting frequency is low.

* * * * *